US008112078B2

(12) United States Patent
Calabrese

(10) Patent No.: US 8,112,078 B2
(45) Date of Patent: Feb. 7, 2012

(54) SYSTEM, METHOD AND PROGRAM FOR CONFIGURING A MOBILE TERMINAL TO FUNCTION AS A TWO-WAY RADIO

(75) Inventor: Stephen Calabrese, Jeffersonville, IN (US)

(73) Assignee: Critical RF, Inc., Jeffersonville, IN (US)

( * ) Notice: Subject to any disclaimer, the term of this patent is extended or adjusted under 35 U.S.C. 154(b) by 999 days.

(21) Appl. No.: 12/076,170

(22) Filed: Mar. 14, 2008

(65) Prior Publication Data

US 2009/0233596 A1 Sep. 17, 2009

(51) Int. Cl.
*H04W 4/00* (2009.01)
*H04L 12/66* (2006.01)

(52) U.S. Cl. .................... 455/426.1; 455/426.2; 370/352

(58) Field of Classification Search ............... 455/426.1, 455/426.2; 370/352
See application file for complete search history.

(56) References Cited

U.S. PATENT DOCUMENTS

| 4,551,854 | A | 11/1985 | Rutty et al. |
| 4,991,197 | A | 2/1991 | Morris |
| 5,657,371 | A | 8/1997 | Suomi et al. |
| 5,930,719 | A | 7/1999 | Babitch et al. |
| 6,055,443 | A | 4/2000 | Exner et al. |
| 7,170,863 | B1 | 1/2007 | Denman et al. |
| 7,466,988 | B2 | 12/2008 | Koskinen et al. |
| 2001/0021659 | A1 | 9/2001 | Okamura |
| 2002/0109481 | A1 | 8/2002 | Waterman et al. |
| 2003/0003876 | A1 | 1/2003 | Rumsey |
| 2004/0151151 | A1 | 8/2004 | Kubler et al. |
| 2004/0203510 | A1 | 10/2004 | Claxton et al. |
| 2005/0288039 | A1 | 12/2005 | Liou |
| 2006/0046697 | A1 | 3/2006 | Koren et al. |
| 2007/0087777 | A1 | 4/2007 | Shibuya et al. |
| 2007/0142047 | A1 | 6/2007 | Heeschen et al. |
| 2007/0287499 | A1 | 12/2007 | Calabrese |
| 2008/0268792 | A1 | 10/2008 | Munje |

OTHER PUBLICATIONS

Notification of Transmittal of the International Search Report and the Written Opinion of the international Searching Authority issued in corresponding International Application No. PCT/US2009/001582 dated Nov. 3, 2009.
Office Action dated Feb. 8, 2010 for U.S. Appl. No. 11/797,881.
International Search Report and Written Opinion of the International Searching Authority for Application No. PCT/US07/11065, dated Jun. 18, 2008.

*Primary Examiner* — Pierre-Louis Desir
*Assistant Examiner* — Joshua Schwartz
(74) *Attorney, Agent, or Firm* — Buchanan Ingersoll & Rooney PC

(57) ABSTRACT

A system, method and program for enabling a mobile terminal to communicate with a transceiver via two-way radio over a communication network. The mobile terminal receives a first radio communication, converts the first radio communication into first data packets, masks a destination port of the first data packets to appear as a data transfer port of the mobile terminal configured to exchange data with a server, and transmits the first data packets having the masked destination port to the server via the communication network. The mobile terminal receives second data packets, which are converted from a second radio communication transmitted from the transceiver and have a destination port masked to appear as a data receiving port of the mobile terminal configured to exchange data with the server, from the server via the communication network, converts the second data packets to the second radio communication, and outputs the second radio communication.

60 Claims, 14 Drawing Sheets

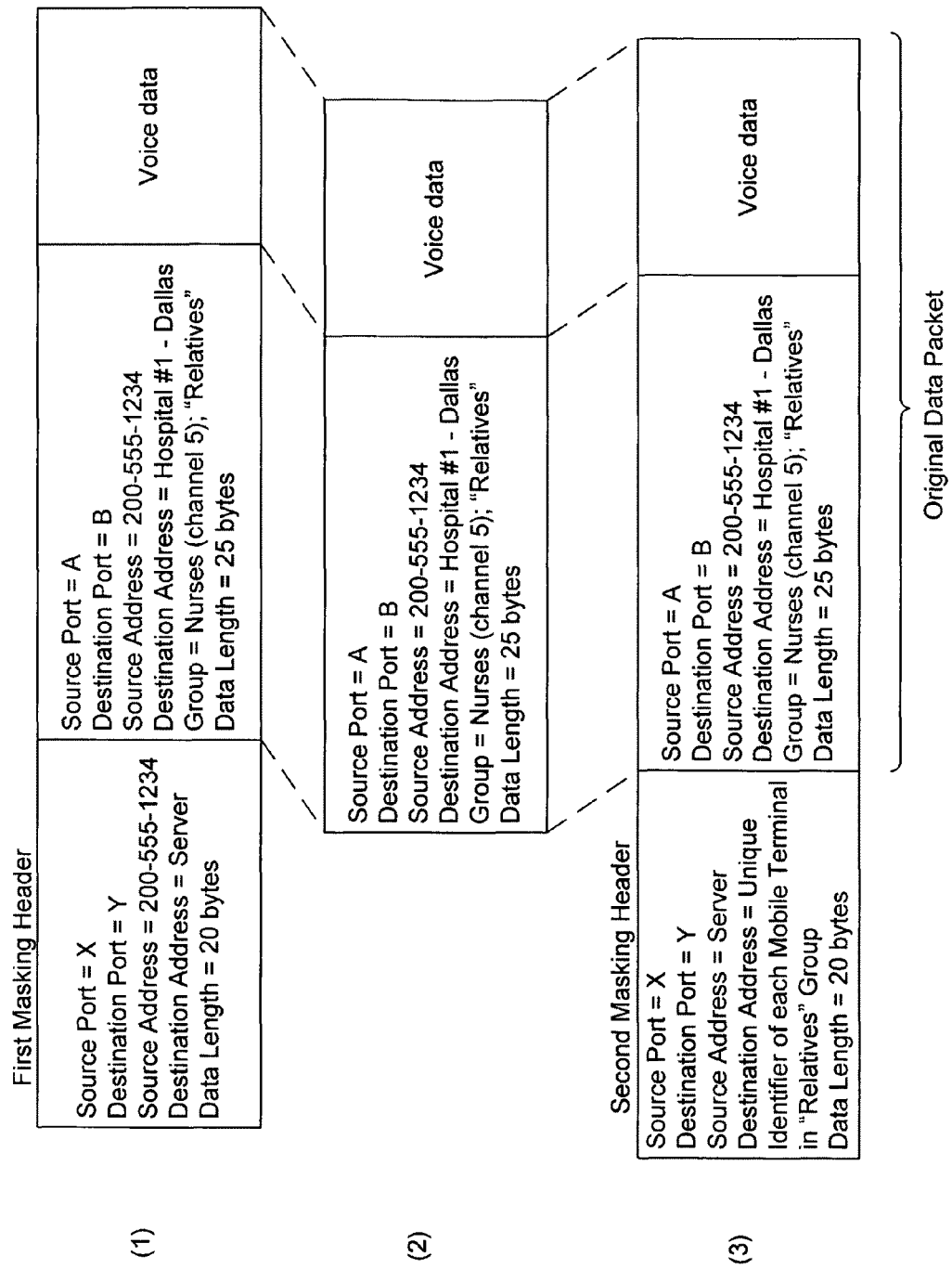

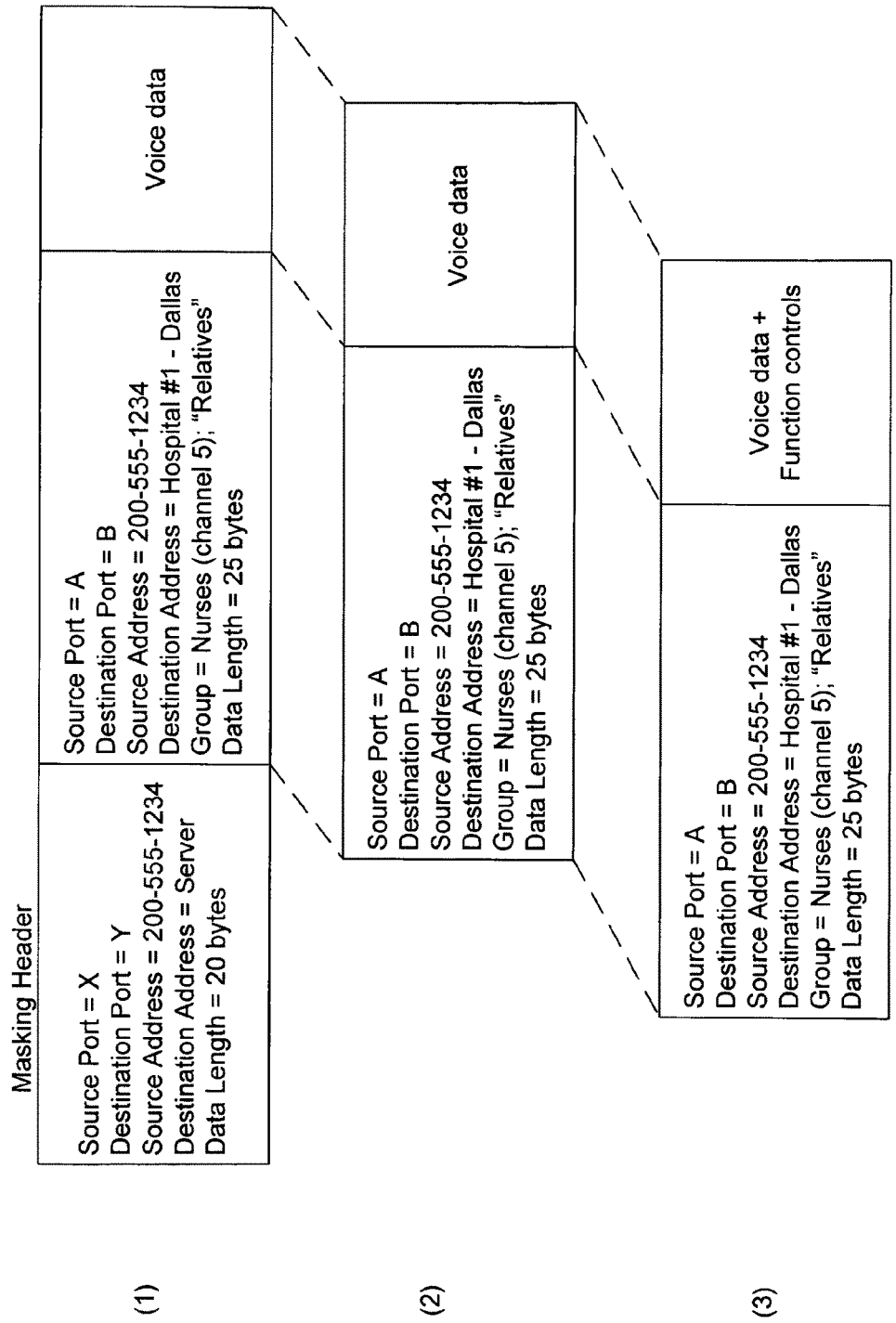

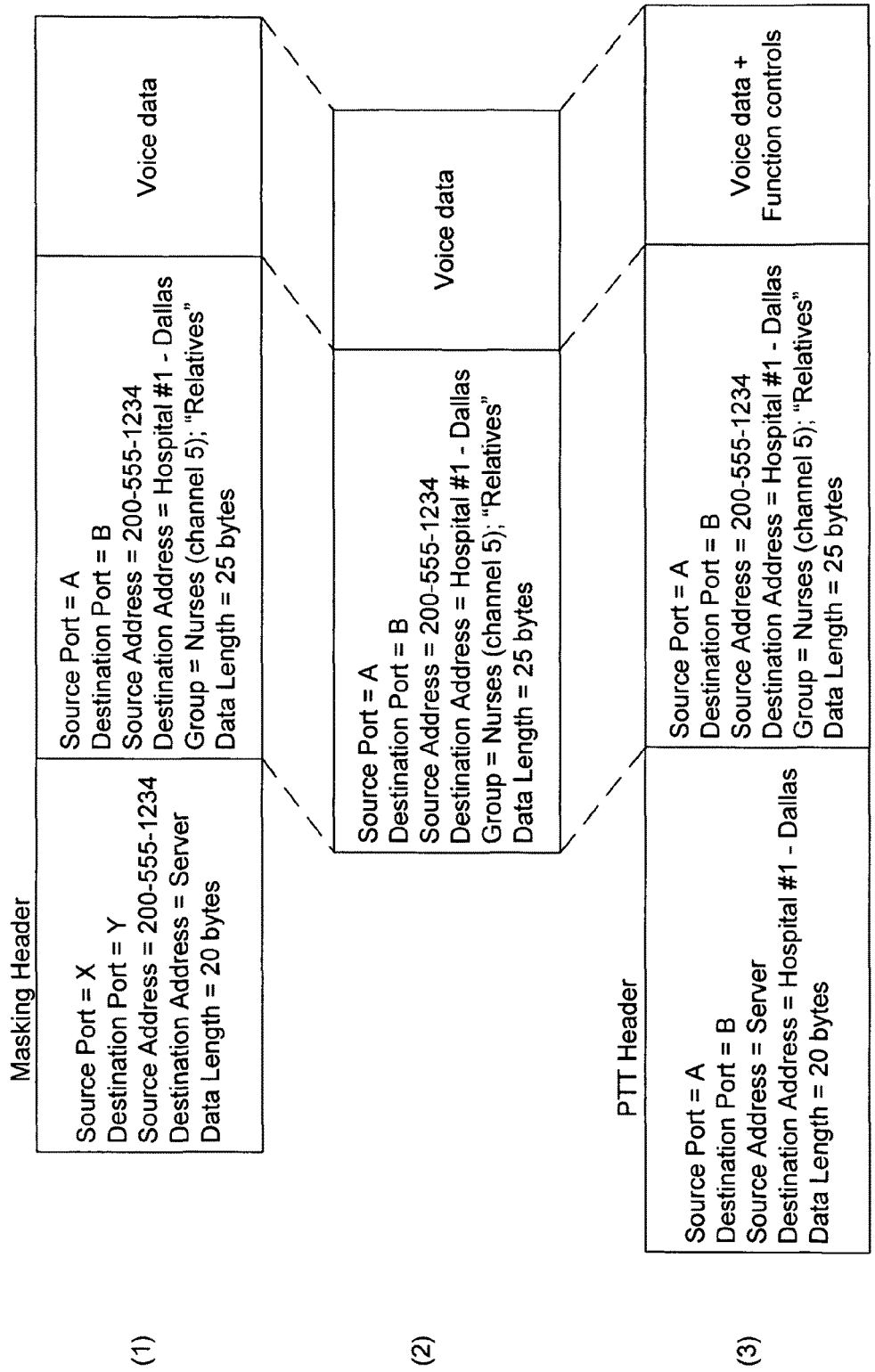

SYSTEM, METHOD AND PROGRAM FOR CONFIGURING A MOBILE TERMINAL TO FUNCTION AS A TWO-WAY RADIO

FIELD OF THE DISCLOSURE

The present disclosure relates to a system, method and program for configuring a mobile terminal to function as a two-way radio over a public or private communication network and communicate with other radio systems or mobile terminals via RoIP (Radio over Internet Protocol).

BACKGROUND

A two-way radio is a radio that can both transmit and receive (a transceiver) radio communications over a particular channel or frequency band. Two-way radios are often equipped with a push-to-talk (PTT) button that a user presses to initiate transmission of an analog radio communication to a recipient user. Such two-way radios are designed to operate according to a half-duplex system that provides for communication in both directions, but only in one direction at a time (i.e., not simultaneously). For instance, a two-way radio user initiates a radio communication to another user over a particular channel by pressing the PTT button on the transmitting user's two-way radio. The two-way radio of the recipient user must be tuned to the same frequency, and the recipient user must wait for the transmitting user to end his or her radio communication before the recipient user can reply. The transmitting user ends his or her radio communication by releasing the PTT button, which causes the channel to become available for the recipient user to transmit a reply radio communication. Once the transmitting user's radio communication is complete, the recipient user can then reply to the transmitting user over the same frequency by pressing the PTT button on his or her two-way radio to transmit a reply radio communication. The PTT button constitutes a change-of-state switch to switch the two-way radio from a voice transmission mode to a voice reception mode.

Two-way radios are widely used for personal, commercial and governmental purposes due to their ease of use and ability to transmit communications wirelessly. However, over-the-air radio communications are limited to particular geographic ranges.

Half-duplex radio communication functionality has been added to duplex cellular (mobile) phones in recent years to allow a cellular user to communicate with one or more other cellular users having a similarly equipped cellular radiotelephone via a half-duplex communication transmitted over a circuit switching network. Cellular half-duplex radio communication functions are often referred to as walkie-talkie or PTT PoC (push to talk over cellular) services. For instance, cellular phones have been equipped with a PTT button that a user can press to initiate a half-duplex radio communication with another user having a similarly equipped cellular phone, i.e., a radiotelephone. The initiating user first presses the PTT button on his or radiotelephone to initiate a radio communication to the intended recipient user over a cellular carrier network, and the base station of the cellular carrier network nearest to the recipient user, under the control of a central relay station of the cellular carrier, directs the half-duplex radio communication to the recipient user. The recipient user can then respond to the initiating user with a half-duplex radio communication by pressing the PTT button on the recipient user's radiotelephone. These half-duplex radio communications are transmitted as data over voice communications that are carried over a limited range of radio frequencies licensed to the cellular network carrier, such as by the Federal Communication Commission (FCC).

By pressing the PTT button on his or her radiotelephone, the initiating user requests the nearest base station of the cellular carrier network to assign the initiating user a particular radio frequency (channel) to transmit the half-duplex radio communication to the recipient user(s) on the voice network of the cellular carrier. However, due to the limited number of frequencies assigned to a particular cellular carrier network, there is often network congestion that prohibits the initiating user from acquiring a channel from the cellular carrier. Even if the initiating user is able to acquire a channel from the cellular carrier to transmit a half-duplex radio communication, the channel is released when the initiating user terminates the communication by releasing the PTT button on his or her cellular phone. The recipient user, to be able to reply to the initiating user's radio communication, must then acquire a channel from the cellular carrier. The congestion of a cellular carrier network is also affected by the number of mobile telephone "interconnect" calls made over the cellular carrier network. Unlike radio communications that operate according to a half-duplex system, mobile telephone calls, like landline telephone calls, operate according to a full-duplex system. A full-duplex system allows communication in both directions simultaneously, which allows each caller to speak and be heard at the same time. Accordingly, each user on a mobile telephone call must therefore acquire an independent channel, which increases the congestion of the cellular carrier network. In addition, cellular PTT PoC services are presently supported only between users serviced by the same cellular carrier, meaning that users subscribing to different carriers are unable to transmit half-duplex radio communications to each other.

Many cellular carriers offer both voice and data services over the cellular carrier network to their subscribers. Voice services enable cellular subscribers to talk to other subscribers via full-duplex mobile communications and cellular half-duplex radio communications. Data services enable cellular subscribers to wirelessly connect to communication networks such as the Internet or private LANs in order to access websites and send and receive data such as email, text and chat messages, digital pictures and/or videos.

The technology of VoIP (Voice over Internet Protocol) has gained popularity in recent years. VoIP enables the transmission and reception of voice audio through the Internet or other packet switched networks. In VoIP, a software application operating on a computer or a hardware modem converts captured analog voice signals into one or more digital packets, and then transmits the digital packets to a recipient user over the Internet. A computer or modem of the recipient user converts the received digital packets back into analog audio data and outputs the analog audio data to an output device such as a speaker or telephone earpiece. VoIP thus provides a vehicle for moving data packets of voice audio from point-to-point via the Internet. VoIP provides full-duplex communication, similar to conventional land-line telephone services.

The technology of RoIP (Radio over Internet Protocol) has also gained popularity in recent years. RoIP is similar to VoIP in that RoIP also involves capturing analog voice signals, converting the analog signals into digital packets and then transmitting the digital packets through the Internet or other packet switched networks to one or more receiving devices. However, RoIP augments two-way radio communications rather than telephone calls. With RoIP, at least one node of a network is a radio connected via an Internet protocol (IP) to other nodes in the radio network. Accordingly, RoIP technology involves the conversion of half-duplex analog signals into digital packets and the subsequent transmission of the digital packets to a receiving device.

When converting a received analog signal into digital packets for VoIP or RoIP, the converting device identifies a source port and a destination port along with source and destination network addresses (e.g., IP addresses) in a header of the digital packet. Ports are 16-bit unsigned integers used to map data to a particular process running on a computer. A process may bind to a particular port to send and receive data, meaning that the process will listen for incoming packets whose destination port matches the port number to which it is bound, and send outgoing packets whose source port is set to the port number to which it is bound. Processes implementing common services will normally listen on specific port numbers which have been defined by convention for use with a given communication protocol. For instance, the Internet Assigned Numbers Authority (IANA) assigns port numbers to specific processes that communicate via protocols such as TCP (transmission control protocol) and UDP (user datagram protocol). For example, a server used for sending and receiving email may provide both an SMTP service for sending email and a POP3 service for receiving email. These services will be handled by different processes of the server, and the port number will be used to determine which data is associated with which process. By convention of the IANA, the SMTP server will listen on port 25, while the POP3 server will listen on port 110. Similarly, VoIP and RoIP applications are commonly assigned certain port numbers by convention.

However, cellular and satellite carriers regularly block ports dedicated to VoIP and RoIP applications. Accordingly, mobile terminal users are prohibited from operating VoIP and RoIP applications due to usage constraints placed on the users by the cellular and satellite carriers.

SUMMARY OF THE DISCLOSURE

An exemplary system according to a first aspect of the present disclosure enables a mobile terminal to communicate with a radio frequency transceiver via two-way radio. The system comprises a mobile terminal configured to receive audio inputs and output audio, and a radio frequency transceiver configured to broadcast radio communications to a plurality of radio terminals and receive radio communications from the plurality of radio terminals. The system also comprises a server configured to transmit first data packets from the mobile terminal to the radio frequency transceiver via a communication network, receive second data packets, which are converted from a radio communication transmitted from the radio frequency transceiver, via the communication network, and transmit the second data packets to the mobile terminal via the communication network.

The mobile terminal comprises a command input unit configured to receive a command input including a transmit command to transmit a first radio communication to the radio frequency transceiver via the communication network, and a network address of the sever on the communication network. The mobile terminal also comprises an audio input unit configured to receive the first radio communication as an audio input when the command input unit receives the command input. In addition, the mobile terminal comprises a conversion unit configured to convert the first radio communication received by the audio input unit into the first data packets, and mask a destination port of the first data packets to appear as a data transfer port of the mobile terminal configured to exchange data with the server. The mobile terminal also comprises a transmission unit configured to transmit the converted first data packets having the masked destination port to the server via the communication network. Furthermore, the mobile terminal comprises a reception unit configured to receive the second data packets from the server via the communication network, and output the received second data packets to the conversion unit, which is configured to convert the second data packets into a second radio communication. In addition, the mobile terminal comprises an audio output unit configured to output the second radio communication converted by the conversion unit.

According to the exemplary system of the first aspect, the server is configured to transmit the converted first data packets received from the transmission unit of the mobile terminal to the radio frequency transceiver via the communication network, and the radio frequency transceiver is configured to broadcast the first radio communication, which is converted from the received first data packets, to the plurality of radio terminals. The radio transceiver is configured to receive the second radio communication from at least one of the plurality of radio terminals, and transmit the received second radio communication to the server, which is configured to receive, via the communication network, second data packets converted from the second radio communication transmitted from the radio transceiver. The server is also configured to transmit the second data packets, whose destination port has been masked to appear as a data receiving port of the mobile terminal configured to exchange data with the server, to the reception unit of the mobile terminal.

An exemplary system according to a second aspect of the present disclosure enables a plurality of mobile terminals to communicate with each other via two-way radio. The system comprises a first mobile terminal configured to receive a first radio communication as an audio input, transmit first data packets as the received first radio communication, and output a second radio communication as an audio output. The system also comprises a second mobile terminal configured to receive the second radio communication as an audio input, transmit second data packets as the received second radio communication, and output the first radio communication as an audio output. In addition, the system comprises a server configured to receive the first data packets from the first mobile terminal via a communication network, transmit the received first data packets to the second mobile terminal via the communication network, receive the second data packets from the second mobile terminal via the communication network, and transmit the received second data packets to the first mobile terminal via the communication network.

According to the exemplary system of the second aspect, the first mobile terminal comprises a first command input unit configured to receive a first command input including a first transmit command to transmit the first radio communication to the second mobile terminal via the communication network, and a network address of the server on the communication network. The first mobile terminal further comprises a first audio input unit configured to receive the first radio communication when the first command input receives the first command input. The first mobile terminal also comprises a first conversion unit configured to convert the first radio communication received by the first audio input unit into the first data packets, and mask a destination port of the first data packets to appear as a data transfer port of the first mobile terminal configured to exchange data with the server. In addition, the first mobile terminal comprises a first transmission unit configured to transmit the converted first data packets having the masked destination port to the server via the communication network. The first mobile terminal also comprises a first reception unit configured to receive the second data packets from the server via the communication network, and output the received second data packets to the first conversion unit, which is configured to convert the second data packets into the second radio communication. Furthermore, the first mobile terminal comprises a first audio output unit configured to output the second radio communication converted by the first conversion unit.

According to the exemplary system of the second aspect of the present disclosure, the second mobile terminal comprises a second command input unit configured to receive a second command input including a second transmit command to transmit the second radio communication to the first mobile terminal via the communication network, and a network address of the server on the communication network. The second mobile terminal further comprises a second audio input unit configured to receive the second radio communication when the second command input unit receives the second command input. The second mobile terminal also comprises a second conversion unit configured to convert the second radio communication received by the second audio input unit into the second data packets, and mask a destination port of the second data packets to appear as a data transfer port of the second mobile terminal configured to exchange data with the server. In addition, the second mobile terminal also comprises a second transmission unit configured to transmit the converted second data packets having the masked destination port to the server via the communication network. The second mobile terminal also comprises a second reception unit configured to receive the first data packets from the server via the communication network, and output the received first data packets to the second conversion unit, which is configured to convert the first data packets into the first radio communication. Furthermore, the second mobile terminal comprises a second audio output unit configured to output the first radio communication converted by the second conversion unit.

An exemplary mobile terminal according to a third aspect of the present disclosure is configured to communicate with a transceiver via two-way radio over a communication network via a server interfacing the mobile terminal and the transceiver over the communication network.

The exemplary mobile terminal comprises a command input unit configured to receive a command input including a transmit command to transmit a first radio communication to the transceiver via the communication network, and a network address of the server on the communication network. The mobile terminal further comprises an audio input unit configured to receive the first radio communication as an audio input when the command input unit receives the command input. The mobile terminal also comprises a conversion unit configured to convert the first radio communication received by the audio input unit into first data packets, and mask a destination port of the first data packets to appear as a data transfer port of the mobile terminal configured to exchange data with the server. In addition, the exemplary mobile terminal comprises a transmission unit configured to transmit the converted first data packets having the masked destination port to the server via the communication network for the server to transmit the first radio communication, which is converted from the first data packets, to the transceiver.

The mobile terminal also comprises a reception unit configured to receive second data packets, which are converted from a second radio communication transmitted from the transceiver and which have a destination port masked to appear as the data transfer port of the mobile terminal configured to exchange data with the server, from the server via the communication network, and output the received second data packets to the conversion unit, which is configured to convert the second data packets into the second radio communication. Furthermore, the mobile terminal comprises an audio output unit configured to output the second radio communication as an audio output.

A fourth aspect of the present disclosure provides a computer-readable recording medium having a program stored thereon that causes a mobile terminal communicatively connected to the computer-readable recording medium to communicate as a two-way radio with a transceiver over a communication network via a server. The program causes the mobile terminal to perform an operations of receiving a command input including a transmit command to transmit a first radio communication to a transceiver via the communication network and a network address of the server, and receiving the first radio communication as an audio input. The program also causes the mobile terminal to perform operations of converting the received first radio communication to first data packets upon receiving the command input, and masking a destination port of the first data packets to appear as a data transfer port of the mobile terminal configured to exchange data with the server.

In addition, the program causes the mobile terminal to perform an operation of transmitting the converted first data packets having the masked destination port to the server via the communication network for the server to transmit the first data packets, which are converted back into the first radio communication, to the transceiver. The program also causes the mobile terminal to perform an operation of receiving second data packets from the server via the communication network, where the second data packets have been converted from a second radio communication transmitted from the transceiver and have a destination port masked to appear as the data transport port of the mobile terminal configured to exchange data with the server.

Furthermore, the program causes the mobile terminal to perform operations of converting the received second data packets into the second radio communication, and outputting the second radio communication.

A fifth aspect of the present disclosure provides a method of enabling a mobile terminal to communicate as a two-way radio with similarly or dissimilarly equipped transceivers over a communication network via a server. The method comprises operations similar to those that the above-described exemplary program causes the mobile terminal to perform.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which:

FIGS. 8A-8D are diagrams illustrating a sequence of transmitting and masking data packets according to an exemplary embodiment in which a mobile terminal transmits the data packets to both mobile terminals and legacy RF transceivers;

DETAILED DESCRIPTION OF EXEMPLARY EMBODIMENTS

Exemplary embodiments described herein provide a system, method and program for configuring a mobile terminal to function as a two-way radio and communicate with other radio systems and/or mobile terminals via RoIP over a public or private communication network.

As used herein, a public communication network is a network that is accessible to the general public, such as the Internet and a WAN (wide-area network), for example. Conversely, a private communication network is a network that is accessible to only a predetermined number of users, such as a LAN (local area network), an intranet and a VPN (virtual private network), for example. The public and private communication networks will hereinafter be collectively referred to as a communication network, unless otherwise noted.

As used herein, a mobile terminal may be any electronic device that is configured to communicate with an external communication network, such as the public or private communication networks described above. For example, a mobile terminal may be a personal digital assistant (PDA), an enterprise digital assistant (EDA), a personal computer (PC), such as a laptop, for example, a mobile telephone, or a smart phone having voice and data communication capabilities. Such mobile terminals may be equipped with wireless communication capabilities to enable portable access to the communication network. For example, the mobile terminals may be configured to communicate with the communication network via a cellular and/or satellite relay network.

Figure 1:
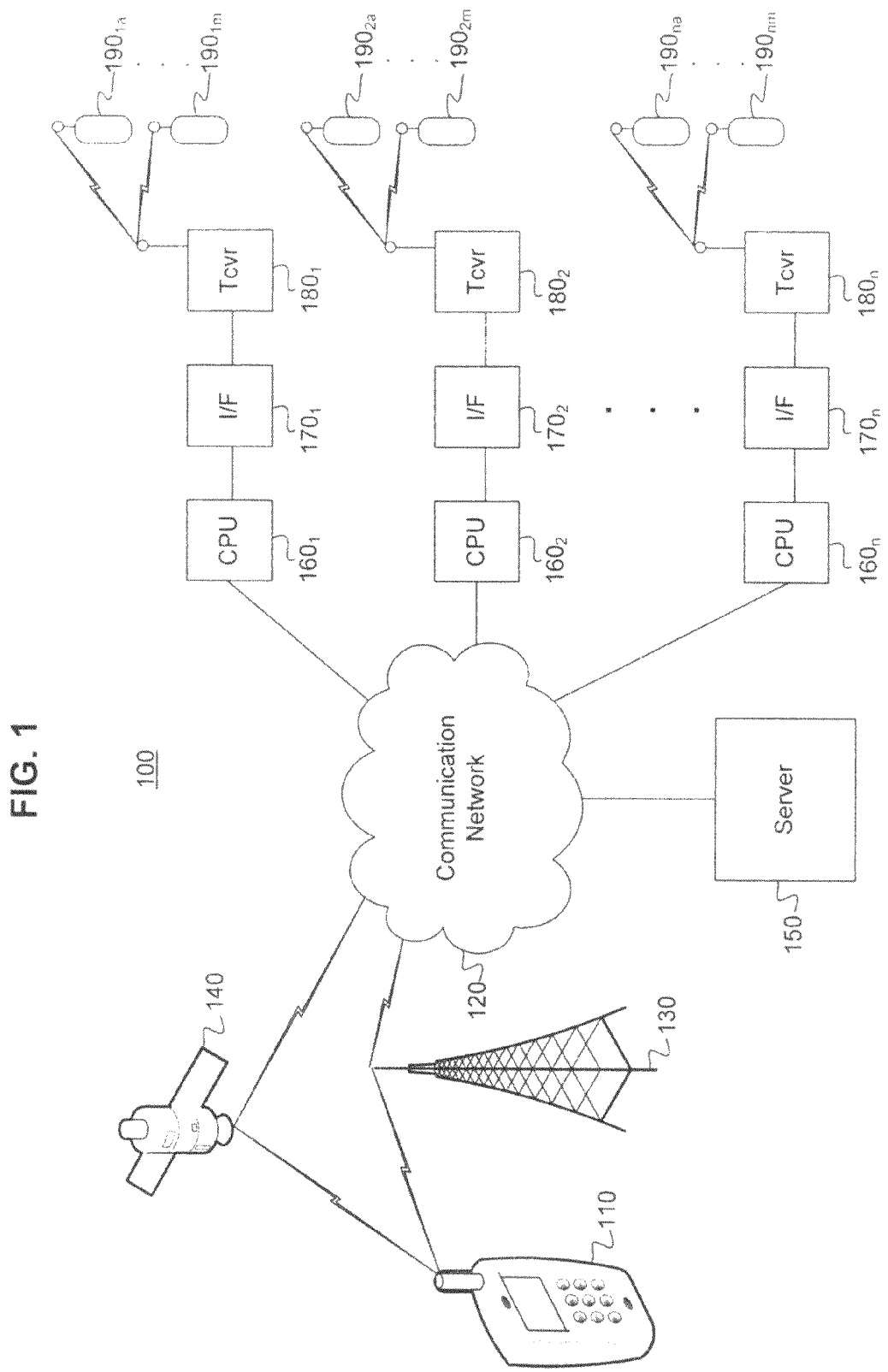
FIG. 1 is a block diagram illustrating a system according to an exemplary embodiment.

FIG. 1 illustrates a block diagram of a system 100 according to an exemplary embodiment of the present disclosure. As shown in FIG. 1, a mobile terminal 110 is connected to a server 150 via a communication network 120, such as the Internet, for example. The mobile terminal 110 may be configured to wirelessly communicate with the communication network 120 and server 150 via a base station 130 of a cellular network. Alternatively, the mobile terminal 110 may be connected to the communication network 120 via a satellite 140 of a satellite network. The example of FIG. 1 illustrates that the base station 130 and the satellite 140 communicate wirelessly with the communication network 120. Alternatively, the base station 130 and/or satellite 140 can communicate with a terrestrial relay station (not shown) that routes communications to and from the server 150 via the communication network 120 through wired communication mediums.

The mobile terminal 110 is configured to receive analog audio signals as half-duplex radio communications and output analog audio signals as half-duplex radio communications. The mobile terminal 110 transmits digital audio signals to the server 150 via the communication network 120 by means of the base station 130 of the cellular carrier network and/or the satellite 140 of the satellite network. In addition, the mobile terminal 110 receives digital audio signals from the server 150 via the communication network 120. The audio signals transmitted from the mobile terminal 110 to the server 150 and the audio signals transmitted from the server 150 to the mobile terminal 110 are digital data packets to be sent across the communication network 120 via an IP protocol, such as TCP/IP, for example. The digital data packets transmitted and received by the mobile terminal 110 are audio packets including digitized half-duplex radio communications. The digital data packets, in addition to including the audio of a half-duplex radio communication, can include or be accompanied with function controls such as a PTT component (instruction) to give an indication to the recipient device that a half-duplex radio communication is being received. The PTT component included in or accompanying the digitized half-duplex radio communication indicates to the recipient device that it has received a radio signal. The recipient device interprets the PTT component as an instruction to output the audio of the received half-duplex radio communication and/or transmit the half-duplex communication, as an analog signal, to a two-way radio by applying an appropriate voltage to a transmission circuit of the two-way radio. The PTT component will be explained in greater detail below.

As described above, the mobile terminal 110 may be any electronic device that is configured to communicate with an external network, such as the communication network 120. Accordingly, it is to be understood that the mobile terminal 110 can perform additional functions that are not the focus of the present disclosure.

As shown in FIG. 1, the server 150 is connected to a plurality of computers (CPU) $160_1, 160_2 \ldots 160_n$ (n>1) via the communication network 120. The CPUs 160 may be desktop computers, laptop computers, servers or workstations, for example. The plurality of CPUs 160 are each respectively connected to an interface (I/F) $170_1, 170_2 \ldots 170_n$, which are in turn each respectively connected to a radio frequency (RF) transceiver (Tcvr) $180_1, 180_2 \ldots 180_n$. Each RF transceiver 180 is configured to perform two-way radio communications with a plurality of radio terminals $190_a \ldots 190_m$ (0<a<m) via a predetermined channel, or frequency band. Only those radio terminals 190 which are tuned to the predetermined channel can communicate with one another and the radio frequency transceiver 180. In addition, the radio terminals 190 are limited to communicate with a particular RF transceiver 180 by their physical distance from the RF transceiver 180. In the example of FIG. 1, RF transceiver $180_1$ is configured to communicate with radio terminals $190_{1a} \ldots 190_{1m}$, RF transceiver $180_2$ is configured to communicate with radio terminals $190_{2a} \ldots 190_{2m}$, and RF transceiver $180_n$ is configured to communicate with radio terminals $190_{na} \ldots 190_{nm}$. According to an exemplary embodiment, the RF transceivers 180 and radio terminals 190 could be two-way radios, cellular radiotelephones (including base stations), and any other device capable of duplex radio frequency communications. The radio terminals 190 can be RF transceivers, similar to the RF transceivers 180. However, to distinguish them from the RF transceivers 180 that are connected to the CPUs 160 via the interfaces 170, they are referred to herein as radio terminals for clarity of illustration.

Legacy RF transceivers are designed to function as duplex and/or half duplex radios, where an operator presses a PTT button of the RF transceiver to broadcast a half-duplex radio communication over a particular channel to one or more other RF transceivers or radio terminals located within a predetermined geographic range of the transmitting RF transceiver.

Due to the geographical constraints of over-the-air radio communications, legacy RF transceivers cannot communicate over a particular channel with other RF transceivers or radio terminals that are outside the geographic range of the transmitting RF transceiver.

However, in the exemplary embodiment illustrated in FIG. 1, the connection of the RF transceivers 180 to the communication network 120 via the interfaces 170 and CPUs 160 enables the RF transceivers 180 to receive and transmit radio communications to any other transceiver without the ordinary geographic constraints of over-the-air radio broadcasts. Similarly, the connection of the mobile terminal 110 to the RF transceivers 180 via the communication network 120, CPUs 160 and interfaces 170 enables the RF transceivers 180 and mobile terminal 110 to communicate without regard to geographic constraints.

The ability to communicate over a two-way transceiver by means of a computer network such as the communication network 120 offers a number of advantages. First, the geographic range of the RF transceiver 180 is no longer limited. Using the CPUs that are connected to the communication network 120, such as the Internet, for example, RF transceivers 180 can be located anywhere in the world and communicate with the mobile terminal 110 via the communication network 120. Second, the communication channels or frequency bands used by the mobile terminal 110 and RF transceivers need not be compatible with each other. By communicating over the communication network 120 by means of an IP protocol, for example, the system 100 becomes frequency agnostic. As a result, the mobile terminal 110 and RF transceivers 180 are able to send and receive audio signals as radio communications to and from one another without geographic or frequency constraints.

A third advantage is that an enterprise can continue to use its legacy equipment to achieve this expanded communication ability, and the mobile terminal 110 can communicate with such legacy equipment located in anywhere in the world via the communication network 120.

The CPUs 160 receive audio signals as one or more digital audio data packets via the communication network 120 and server 150. According to the exemplary embodiment illustrated in FIG. 1, one or more of the CPUs 160 receive the audio data packets from the mobile terminal 110 via the server 150. Alternatively, the CPUs 160 could receive audio data packets from another one of the CPUs 160 via the communication network 120 and server 150. For example, CPU $160_1$ can transmit audio data packets to CPU $160_2$ according to a predetermined protocol such as TCP/IP via the communication network 120 and server 150. The CPU 160 receiving the audio data packets via the communication network 120 converts the digital packets into analog audio signals and outputs the converted audio signals to the corresponding RF transceiver 180 via the corresponding interface 170. The RF transceiver 180 reproduces the audio signal as a half-duplex radio communication by transmitting the half-duplex radio communication to one or more of the radio terminals 190 over a predetermined channel.

Conversely, when the RF transceiver 180 is in the transmit mode, the corresponding interface 170 inputs half-duplex radio communications as modulated analog audio signals to the CPU 160, which then converts the received audio signals into one or more digital audio data packets to be transmitted to the mobile terminal 110 and/or another one of the CPUs 160 via the communication network 120 and server 150. The CPUs 160 can be configured to use any lossy or lossless speech compression/decompression codec to convert analog audio signals received from the RF transceiver 180 into the digital audio data packets, and to convert the digital audio packets received via the communication network 120 into the analog audio signals. One example of a codec used by the CPUs 160 is the GSM 6.10 lossy speech compression and decompression codec, although other versions of the GSM codec or other codecs may also be used.

When the RF transceiver 180 is in the transmit mode to transmit a half-duplex radio communication to the mobile terminal 110 and/or another one of the RF transceivers 180, the interface 170 inputs audio signals generated by the RF transceiver 180 to the CPU 160. The interface 170 is connected to an audio input terminal of the CPU 160, such as a sound card assembly of the CPU 160, for example, and to a receive terminal of the RF transceiver 180 by a suitable connection medium, such as a RS232 serial connection, for example.

The interface 170 is also connected to a control terminal of the CPU 160, such as a USB port, for example, via a suitable connection medium, e.g., a USB cable. When the RF transceiver 180 is in the transmit mode to transmit a half-duplex radio communication to the mobile terminal 110 and/or another one of the RF transceivers 180, the interface 170 detects the modulated analog signals transmitted from the RF transceiver 180. Upon detecting the analog signals transmitted from the RF transceiver 180, the interface 170 transmits a COR (carrier operated relay), or COS (carrier operated switch), instruction to the control terminal of the CPU 160. The COR and COS instructions will hereinafter be collectively referred to as a "communication reception instruction." The communication reception instruction transmitted from the interface 170 to the CPU 160 provides an indication to an application executing on the CPU 160 that it is to receive a modulated analog audio signal representing a half-duplex radio communication. The communication reception instruction notifies the CPU 160 that it is to record the modulated analog audio signal for subsequent conversion to one or more digital data packets that are to be transmitted to the mobile terminal 110 and/or other CPUs 160 via the communication network 120 and server 150. The communication reception instruction transmitted from the interface 170 to the CPU 160 can be, for example, a DC voltage signal (e.g., 5V). The CPU 160 starts to record the modulated analog audio signal transmitted from the RF transceiver 180 via the interface 170, and stops recording the modulated analog audio signal when the interface 170 stops transmission of the communication reception instruction thereto. The communication reception instruction transmitted from the interface 170 to the CPU 160 therefore controls recording of modulated analog audio signals transmitted from the RF transceiver 180 in the CPU 160. Then, the CPU 160 converts the recorded audio signals into one or more digital audio data packets to be transmitted to the server 150 via the communication network 120.

Conversely, when the RF transceiver 180 is in the receive mode, the interface 170 transmits half-duplex radio communications as modulated analog audio signals generated by the CPU 160 to a PTT circuit of the RF transceiver 180. Accordingly, the interface 170 connects an audio output terminal of the CPU 160 to an audio input terminal of the RF transceiver 180, and activates a transmit terminal of the RF transceiver 180 to transmit the audio signals to the radio terminals 190. The interface 170 thus connects the CPU 160 to the RF transceiver 180 to exchange radio communication signals therebetween. For instance, the interface 170 operates to activate a PTT circuit and an audio input terminal (e.g., microphone) of the RF transceiver 180 by applying an appropriate voltage to these components of the RF transceiver 180 when the CPU 160 generates the analog audio signals to be transmitted to the RF transceiver 180.

The interface 170 activates the PTT circuit and audio input terminal of the RF transceiver 180 upon receiving a PTT instruction from the CPU 160. The server 150 includes a database in which each recipient device registered with the server 150 is identified as a CPU 160 connected to a RF transceiver 180 via a corresponding interface 170, or a mobile terminal 110. Upon receiving data packets via the communication network 120, the server 150 determines whether the recipient device is a CPU 160 connected to a RF transceiver 180 via a corresponding interface 170, or a mobile terminal 110, based on a unique identifier of the recipient device that will be explained in greater detail below. When the server 150 receives audio data packets that are to be transmitted to a CPU 160 connected to a RF transceiver 180 via a corresponding interface, the server 150 sends the audio data packets to the CPU 160 together with a PTT instruction. The PTT instruction accompanying the audio data packets are sent by the server 150 to provide instruction to the interface 170 to activate a transmit terminal of the RF transceiver 180, such as a PTT circuit and microphone of the RF transceiver 180, for example.

When the CPU 160 receives digital data packets and the accompanying PTT instruction from the server 150 via the communication network 120, the CPU 160 decodes the data packets to convert the audio component of the data packets into analog audio data. The CPU 160 then transmits the analog audio data and the PTT instruction to the interface 170.

The interface 170 is a control mechanism that provides function controls for interactions between the CPU 160 and the RF transceiver 180 via a RS232 control medium, for example. The RS232 function control of the interface 170 receiving the converted audio signals and the PTT instruction from the CPU 160 cause a change of state of the interface 170 to be detected, due to the PTT instruction. The change of state is input to the RS232 "request to send" pin, and the interface 170 detects a voltage shift. The interface 170 then applies a voltage to the PTT circuit of the RF transceiver 180 to instruct the RF transceiver 180 to transmit the analog audio signal as a half-duplex radio communication. Conversely, when the interface 170 receives modulated analog audio signals from the RF transceiver 180 to be transmitted to the CPU 160, the RS232 control function of the interface 170 detects a voltage shift, and outputs the communication reception instruction to the CPU 160. One example of a hardware configuration of the interface 170 is disclosed in commonly assigned application Ser. No. 11/797,881, filed May 8, 2007, the contents of which are incorporated herein by reference.

The interface 170 is functionally configured to operate with all types of two-way radios, regardless of the manufacturer or type of the radio. For example, the interface 170 can be configured to operate with digital and analog radios, trunked and conventional radios, P25 and LTR radios.

In addition, the interface 170 does not require a static IP or network identification address. Instead, the interface 170, as a communication conduit between the CPU 160 and the RF transceiver 180, can operate without advance provisioning of an IP or network identification address. Thus, the exemplary system 100 of the present disclosure can operate in emergency situations and be survivable and usable on any connection from dial-up, broadband, wi-fi, satellite, etc.

Figure 2:
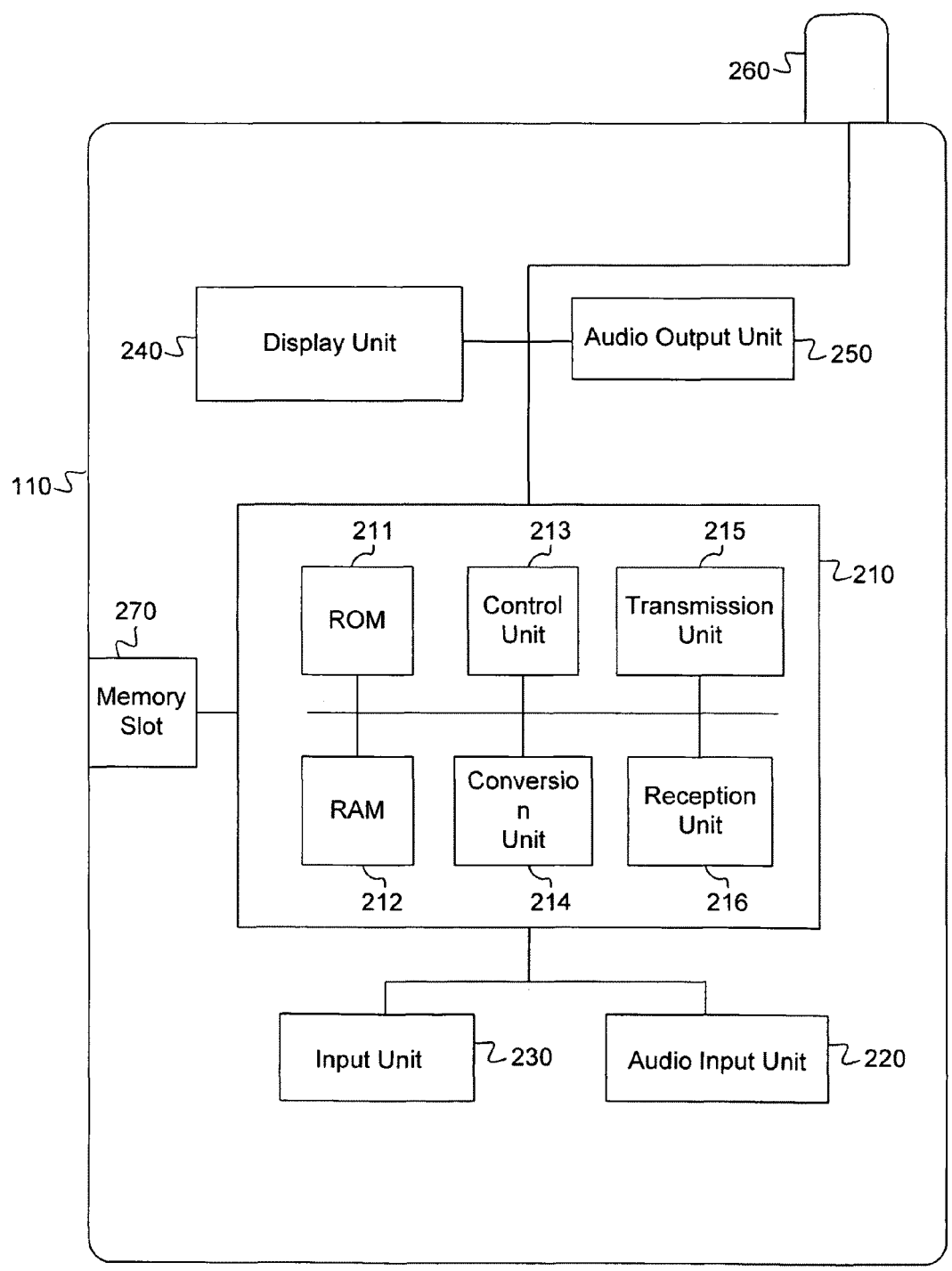
FIG. 2 is a block diagram of an exemplary mobile terminal according to an exemplary embodiment.

FIG. 2 is a block diagram illustrating components of the mobile terminal 110 according to an exemplary embodiment. As shown in FIG. 2, the mobile terminal 110 includes a processing unit 210, an audio input unit 220, an input unit 230, a display unit 240, an audio output unit 250, an antenna 260, and a memory slot 270.

The processing unit 210 includes a ROM (read-only memory) 211, a RAM (random access memory) 212, a control unit 213, a conversion unit 214, a transmission unit 215, and a reception unit 216. The control unit 213 controls the aggregate functions of each component of the mobile terminal 110 as well as the interrelationship and interaction between the other components of the mobile terminal 110. The control unit 213 includes a processor for controlling the operations of the mobile terminal 110. The ROM 211 stores programs, such as an operating system (OS) and application programs, and logic instructions which are implemented by the control unit 213. The RAM 212 is used as a working memory by the control unit 213 when executing the programs and logic instructions stored in the ROM 211.

The audio input unit 220 receives audio inputs from an operator of the mobile terminal 110. The audio inputs may be half-duplex radio communications as well as audible commands or voice messages for mobile telephone calls, for example. Since the present disclosure is concerned with enabling the mobile terminal 110 to function as a two-way radio, the audio inputs hereinafter refer to half-duplex radio communications. However, it is to be understood that the present disclosure is not limited to half-duplex radio communications as an audio input. The audio input unit 220 may include a microphone integrated with a sound card of the mobile terminal 110, or an external microphone communicatively connected to the sound card of the mobile terminal 110.

The input unit 230 includes keys and pointing devices that are manipulated by an operator of the mobile terminal 110. For example, the input unit 230 can include a QWERTY keyboard, a trackball or similar selecting and pointing device, a number pad, etc. The input unit 230 can also include a multi-input touch screen with a virtual keyboard and buttons represented in a graphical user interface.

Any input component of the input unit 230 can be configured to function as a PTT button for the mobile terminal 110 that the operator of the mobile terminal 110 can press to transmit a half-duplex radio communication and release to terminate the radio communication in order to listen to received radio communications. For example, the space bar of a QWERTY keyboard can be designated as the PTT button. Alternatively, the mobile terminal 110 can include a PTT button on a peripheral surface of the mobile terminal 110, similar to conventional two-way radios and radiotelephones, or the PTT button can be designated as a virtual button represented in a graphical user interface. Accordingly, the user of the mobile terminal 110 can designate a particular key or input button to function as the PTT button, or the PTT button can be provided by design.

The display unit 240 is a display for outputting visual images such as a user interface of the OS or application programs installed on the mobile terminal 110. The display unit 240 can also display data transmitted as a radio communication, such as a facsimile, for example. As mentioned above, the input unit 230 can include a multi-input touch screen with virtual keyboards and buttons. As such, the input unit 230 and the display unit 240 can be an integrated component of the mobile terminal 110.

The audio output unit 250 includes a speaker for outputting half-duplex radio communications as audio outputs. The speaker may be integrated into the mobile terminal 110 or externally connected to the mobile terminal 110. The half-duplex radio communications outputted by the audio output unit 250 are received from the server 150 via the communication network 120 in the form of digital data packets that are subsequently converted into analog half-duplex radio communications. The conversion of the data packets into a half-duplex radio communication will be explained in greater detail below. The audio output unit 250 can also output other audio outputs such as received full duplex telephone communications and other audio that are not the focus of the present disclosure and hence will not be described further.

The antenna 260 is used for transmitting and receiving digital data packets to the server 150 via the carriers 130 and/or 140 and the communication network 120. The antenna 260 can also transmit and receive other signals that are not the focus of the present disclosure and hence will not be described further. For clarity of illustration, the antenna 260 is illustrated in FIG. 2 as extending from the main body of the mobile terminal 110. However, the antenna 260 can be integrated within the main body of the mobile terminal 110 as an internal antenna that does not extend from the main body of the mobile terminal 110.

The memory slot 270 is configured to receive a removable memory card inserted therein. The memory slot 270 communicatively couples terminals of the removable memory card to the processing unit 210 to provide the components of the processing unit 210 access to data and programs stored on the memory card, and to store data thereon.

To initiate a half-duplex radio communication, the operator of the mobile terminal 110 inputs a command input into the input unit 230. The command input includes a transmit command to transmit the radio communication to one or more of the RF transceivers 180 via the communication network 120, and a network address (e.g., IP address or URL) of the server 150 on the communication network.

Figure 3:
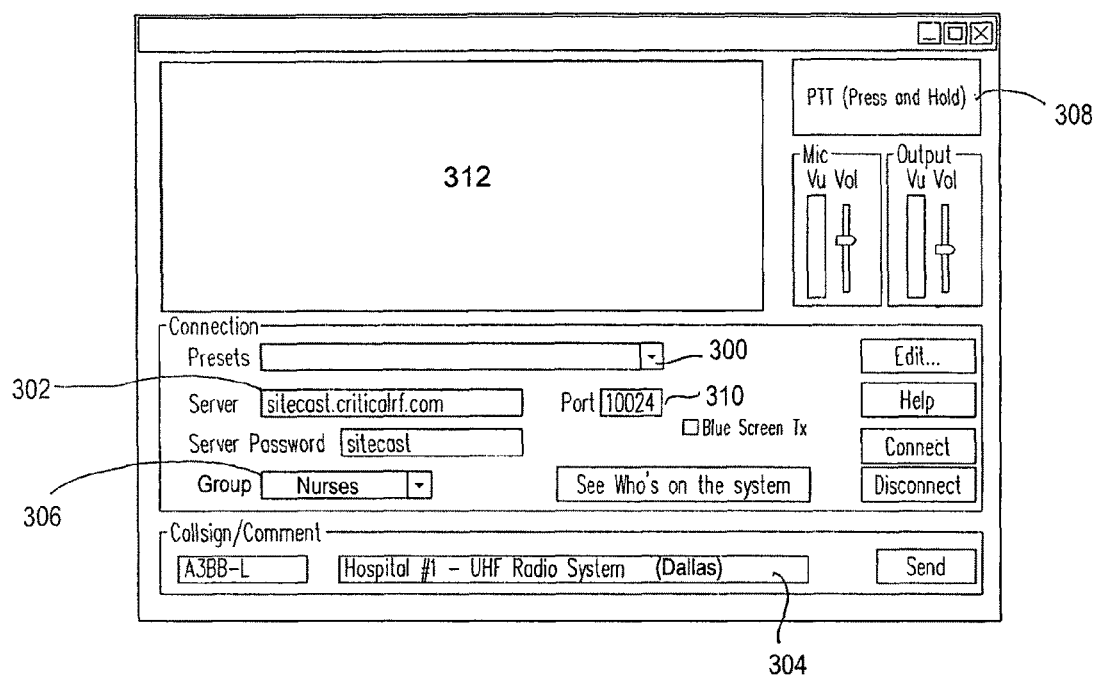
FIG. 3 is an example of a user interface displayed on a mobile terminal according to an exemplary embodiment.

FIG. 3 is an example of a user interface displayed on the display unit 240 of the mobile terminal 110. The user interface illustrated in FIG. 3 provides simple, real-time switching between workgroups and radio systems. As used herein, a "workgroup" is a group of RF transceivers and/or mobile terminals that the user of the mobile terminal 110 designates his or her radio communication to reach. For example, RF transceiver 180₁ illustrated in FIG. 1 can be an RF transceiver located in Washington, D.C., and RF transceiver 180₂ can be an RF transceiver located in Dallas, Tex. By pressing a button 300, a drop down menu of available networks (not shown) is presented to the operator. From this menu, the operator can select a sub-group of transceivers with which to communicate. In effect, this selection also identifies the IP address(es) of the CPU(s) connected to the transceiver(s) with which the operator of the mobile terminal 110 would like to communicate, and determines the destination of the communication. As shown in FIG. 3, the network address of the server 150 is entered into field 302. The network address of the server 150 can be entered by the operator, or the network address of the server 150 can be automatically entered by an OS or application program of the mobile terminal 110. Similarly, if there are a plurality of servers 150 each having a different network address, the operator can select the address of any one of the servers from a drop down menu of entries. The operator can also be prompted to enter a password for the server, as shown in FIG. 3.

The exemplary system of the present disclosure provides multicasting to a predetermined number of recipients, and allows an unlimited number of devices or end users on one radio conversation at the same time. Thus, a workgroup can include one or a plurality of recipients. In particular, the exemplary system allows an operator of the mobile terminal 110 to link to an unlimited number of radio systems and host an unlimited number of RF transceivers 180 and radio terminals 190 via the RF transceivers 180 in one workgroup or a plurality of different workgroups. Assume, for example, that there are ten hospitals in Dallas, Tex. In the example of FIG. 3, the operator selected to transmit a radio communication to Hospital #1 in Dallas, Tex. in field 304. In addition, the operator selected to limit the recipients to only the nurses within Hospital #1 by the designation of nurses in the group field 306. Legacy radio systems used for commercial, governmental or personal purposes often have groups associated with particular channels or frequency bands. For example, in Hospital #1, nurses may be tuned to channel 5, doctors may be tuned to channel 6, and administrative staff may be tuned to channel 7. In the example of FIG. 3, the operator elected to limit the multicast of his or her communication to only the nurses in Hospital #1. However, the present disclosure is not limited to this example. For example, the operator could elect to transmit his or her radio communication to the group of nurses in each of Hospitals #1-10 in Dallas, as well as the group of doctors in one or more hospitals serviced by the RF transceiver 180, in Washington, D.C. Thus, the exemplary system of the present disclosure provides multicasting to an unlimited number of devices or end users.

Once the command input, which includes a transmit command to transmit a radio communication to the desired RF transceiver(s) 180 and the network address of the server 150, is entered into the input unit 230, the operator then presses and holds the PTT button 308 for the duration of his or her radio transmission. When the operator of the mobile terminal 110 presses the PTT button 308 to initiate a radio communication and specifies the destination of the radio communication by using the input unit 230, the control unit 213 is configured to activate the audio input unit 220 by applying an appropriate voltage to the microphone. The received analog audio is captured and processed in the control unit 213, which activates a storage memory of the mobile terminal to store the received analog audio until the operator releases the PTT button 308. The control unit 213 thus generates the audio component of the half-duplex radio communication.

As shown in FIG. 2, the processing unit 210 includes a conversion unit 214. The conversion unit 214 is configured to convert the stored audio component of the half-duplex radio communication received by the audio input unit 220 into one or more digital data packets by using a predetermined compression codec, such as GSM 6.10 used by the CPUs 160 as described above, for example. The conversion unit 214 is configured to convert the received radio communication into the digital data packets when the input unit 230 receives the command input and the operator presses the PTT button 308.

Figure 4:
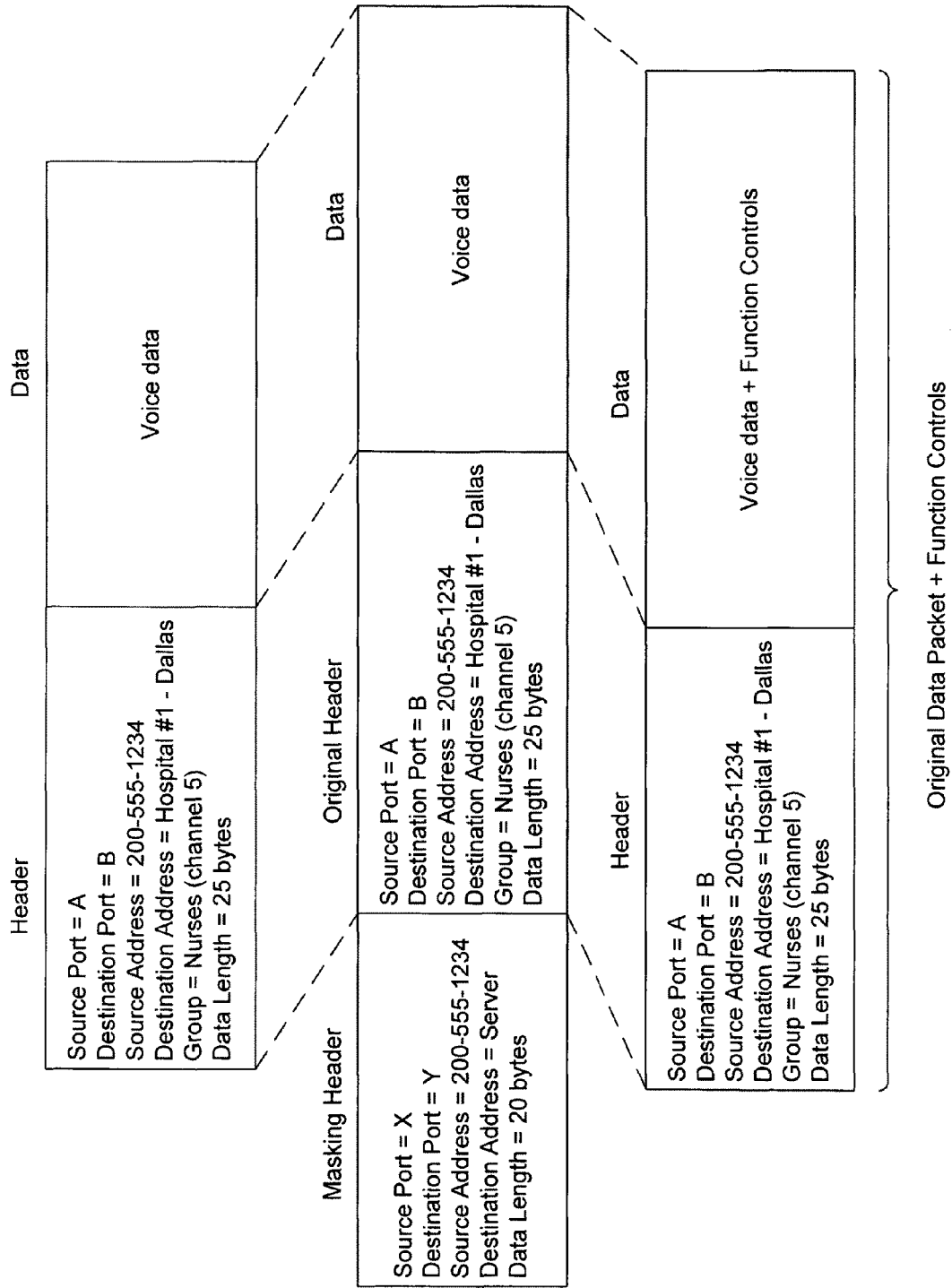
FIG. 4 is an explanatory diagram of masking data packets according to an exemplary embodiment.

FIG. 4 is an explanatory diagram illustrating an example of a data packet created by the conversion unit 214 when the received radio communication is converted into digital data packets to be sent to a recipient device. As shown in FIG. 4, the header of the data packets can contain designations of a source port, a destination port, a source address, a destination address, and a workgroup (if applicable).

Since the conversion unit 214 uses the predetermined codec to convert the received half-duplex radio communication into one or more digital packets, the source port and the destination port of the data packets are initially identified as ports associated with a voice-to-digital data conversion application, by convention. For example, the source and destination ports are initially designated as port numbers A and B by convention, respectively, as shown in FIG. 4. For clarity of illustration, the source and destination ports are described below to have different port numbers from each other. However, it is to be understood that the source and destination ports can have the same port number as each other.

When the conversion unit 214 converts the half-duplex radio communication into the data packet(s), the header of the data packets will contain a source address of the mobile terminal 110, and a destination address identifying an IP or network address of the device that is to receive the data packet. The mobile terminal 110 is assigned a unique address or identifier that is different from addresses or identifiers of other mobile terminals. For example, the address or identifier of the mobile terminal 110 can be a mobile telephone number, an IP address, ESN (electronic serial number), MIN (mobile identification number), IMEI (international mobile equipment identifier) or other unique identifier that is assigned to the mobile terminal 110 by the carrier network or manufacturer of the mobile terminal 110.

In the example of FIG. 3 described above, the operator of the mobile terminal 110 selected to transmit the half-duplex radio communication to Hospital #1 in Dallas, Tex. in field 304. In addition, the operator selected to limit the recipients to only the nurses within Hospital #1 by the designation of the group of nurses (channel 5) in the group field 306. In accordance with this example, the header of the data packet contains a source address of "200-555-1234", which is the mobile telephone number of the mobile terminal 110, and a destination address of Hospital #1 in Dallas, Tex. The example of FIG. 4 illustrates that the mobile telephone number is specified as the source address of the mobile terminal 110. However, the present disclosure is not limited thereto. The source address of the mobile terminal 110 can be any address or identifier that uniquely identifies the mobile terminal 110, such as the addresses and identifiers described above, for example. The destination address of the data packet is an IP address or network address of the CPU $160_2$ corresponding to the RF transceiver $180_2$ located in Dallas, Tex. Since designations of IP or network addresses are known in the art, FIG. 4 indicates that the destination address is "Hospital #1—Dallas," for clarity of illustration.

The header of the data packets can also include a data length of the header, among other information. In the example of FIG. 4, the data length of the header is specified to be 25 bytes. Specifying the data length in the header permits the recipient device to determine when the header ends. For example, if the data length of the header is specified to be 25 bytes in the header, the recipient device can determine that the audio data (voice data and function controls, if applicable) of the packet begin at the twenty-sixth byte of the packet. However, it is not necessary that the data length of the header be specified. The length of a header may be predefined according to a predetermined communication protocol. In this case, the recipient device would be able to determine where the header ends based on the predefined header size of the communication protocol.

As described above, carrier networks such as cellular carriers and satellite carriers regularly block ports that are associated with processes that convert audio data into digital data packets for transmission or reception. The system of the present disclosure obviates this constraint by providing transparency on any network. In particular, to ensure successful transmission of the data packets containing the digitized half-duplex radio communication, the conversion unit 214 masks a destination port, and possibly a source port, of the data packets to appear as a data transfer port of the mobile terminal 110 that is configured to exchange data with the server 150.

FIG. 4 is an explanatory diagram illustrating the concept of masking data packets according to an exemplary embodiment. By using the predetermined codec to convert the received radio communication into the digital packets, the source port and the destination port of the data packets are initially identified as ports associated with a voice-to-digital data conversion application, by convention. For instance, the source and destination ports are initially designated as port numbers A and B by convention, respectively, as illustrated in FIG. 4. However, since cellular carriers and satellite carriers regularly block such ports, the conversion unit 214 masks the data packets by appending a new header onto the converted packet. As shown in FIG. 4, a masking header, in which at least the destination port has been changed to port number Y, is appended to the original header of the converted packets. In addition, the source port can also be changed to port number X in the masking header appended to the original header. The conversion unit 214 can change the destination port as well as the source port of the data packets to any data transfer port of the mobile terminal 110 that is not associated with transferring audio data converted from voice data. For example, the conversion unit 214 can change the destination port to be port number 80 that is associated with transferring web pages according to the TCP protocol, or to port number 25 for sending email according to the TCP and UDP protocols. In effect, the conversion unit 214 makes the data packets appear as if the mobile terminal 110 is sending or receiving data from a web site or data source in accordance with the constraints placed on data transfer by the carrier network. The example of FIG. 3 illustrates that the conversion unit 214 will change the destination port of the packets to port number 10024. The operator can designate a particular port number through the user interface, or the conversion unit 214 can automatically designate the masking port number to any data transfer port of the mobile terminal 110 that is not associated with transferring audio data converted from voice data.

In addition, when masking the original data packet, the conversion unit 214 also specifies the IP or network address of the server 150 in the destination address field of the masking header. Although the half-duplex radio communication is intended to be received by the RF transceiver $180_2$ in Dallas, Tex., according to the above example, the mobile terminal 110 transmits the data packet to the server 150, which in turn transmits the data packet to the CPU 160 corresponding to the RF transceiver 180 that is to receive the half-duplex radio communication transmitted from the mobile terminal 110, e.g., CPU $160_2$ corresponding to RF transceiver $180_2$ in Dallas, Tex. Accordingly, the conversion unit 214 specifies the IP or network address of the server 150 in the destination address of the masking header, so that the data packet having the masked header will be transmitted to and received by the server 150.

The transmission unit 215 then transmits the data packets having the masked destination port, and possibly the masked source port, to the server 150 via the communication network 120 by means of the base station 130 of the cellular carrier and/or the satellite 140 of the satellite carrier. The transmission unit 215 transmits the data packets to the server 150 by using the data services network of the cellular or satellite carrier, instead of the voice services network.

The server 150 receives the data packets having the masked port(s) from the mobile terminal 110, and strips (i.e., removes) the masking header from the data packets to reveal the original header. For example, the server 150 can refer to the data length in the masking header to determine at what point in the packets the masking header ends. In the example of FIG. 4, the data length of the masking header is identified as 20 bytes. In this case, the server 150 will strip the first 20 bytes corresponding to the masking header, and route the original packets to the intended recipient based on the destination address specified in the original header, e.g., CPU $160_2$ corresponding to RF transceiver $180_2$ in Dallas, Tex. In this example, the server 150 refers to the above-described database and determines that the recipient device is CPU 160₂, which is connected to RF transceiver 180₂ via interface 170₂, based on the destination address identified in the original header. Accordingly, the server 150 transmits a PTT instruction as function controls together with the original data packets to the CPU 160₂, as shown in FIG. 4.

In the example of FIG. 4, the data lengths of the masking header and the original header are specified. However, it is not necessary that the data lengths of either header be specified. The length of the headers may be predefined according to a predetermined communication protocol, as described above. In this case, the server 150 would intuitively be able to determine where the masking header ends based on the predefined header size of the communication protocol.

The masking of data transfer ports of the data packets transmitted from the mobile terminal 110 to the server 150 was described with reference to the constraints by the network carriers. The present disclosure is not limited thereto. The conversion unit 214 can also mask data packets to traverse firewalls and NAT (network address translation) of the CPUs 160, for example.

Accordingly, the exemplary system disclosed herein provides transparency on any network. The transparency of the system to carrier constraints, firewalls and NAT offers several advantages. First, it greatly reduces setup time for operators of the mobile terminal 110 and the radio systems. Second, client and network transparency allows the operators of the mobile terminal 110 and the radio systems to be able to multicast radio communications to an unlimited number of users without the geographic and channel constraints of ordinary over the air radio broadcasts. Third, due to the network transparency, the system allows operators to be able to send half-duplex radio communications without having to understand the complexities of carrier port constraints and firewalls.

The mobile terminal 110 also receives half-duplex radio communications, in the form of digital packets, from one or more of the RF transceivers 180 via the server 150 and communication network 120. In particular, a half-duplex radio communication received by a RF transceiver 180 from one of the corresponding radio terminals 190 is communicated to the corresponding interface 170, which transmits the modulated analog audio data of the radio communication to the corresponding CPU 160 together with the above-described communication reception instruction. The CPU 160 then converts the received radio communication into one or more digital data packets, and transmits the digital data packets to the server 150 via the communication network 120.

The server 150, upon receiving the data packets from the CPU 160, detects that the mobile terminal 110 is the intended recipient based on the destination address included in the header of the data packets. As described above, the mobile terminal 110 is assigned a unique address or identifier that is different from addresses or identifiers of other mobile terminals, e.g., a mobile telephone number, an IP address, ESN, MIN, IMEI or other unique identifier that is assigned to the mobile terminal 110 by the carrier network or manufacturer of the mobile terminal 110. The CPU 160 can designate the destination address of the data packets as the unique address or identifier of the mobile terminal 110, or can identify a name or other identification information of the operator of the mobile terminal 110 as the destination address of the data packets.

The database of the server 150 contains the unique address or identifier of each mobile terminal 110 registered with the server 150. The database of the server 150 can also store the unique address or identifier of the mobile terminal 110 in association with the operator's name or other identification information of the mobile terminal 110. Upon receiving the data packets from the CPU 160, the server 150 detects the destination address included in the header of the data packets. In the event that the CPU 160 designated the operator's name or other identification information of the mobile terminal 110 as the destination address of the data packets, the server 150 accesses the database to find the unique address or identifier of the mobile terminal 110 associated with the operator's name or other identification information of the mobile terminal 110 designated in the destination address of the data packets.

Since the CPU 160 converts the half-duplex radio communication received from the RF transceiver 180 via the corresponding interface 170 into one or more digital packets, the source port and the destination port of the data packets may be initially identified, by convention, as ports associated with a voice-to-digital data conversion application resident on the CPU 160. For example, the source and destination ports may be initially designated as port numbers A and B by convention, respectively, as shown in the example of FIG. 4. If the CPU 160 transmits the data packets to the server 150 via a dial-up, broadband or wi-fi connection, for example, the data packets are likely not subjected to the port blocking constraints imposed by carrier networks such as cellular carriers and satellite carries. However, the data packets transmitted from the CPU 160 to the server 150 may not reach the mobile terminal 110 if the mobile terminal 110 is to receive the data packets from the server 150 via a cellular or satellite carrier. Accordingly, the server 150 can be configured to automatically mask the header of the data packet intended to be received by the mobile terminal 110, unless the server 150 is informed that the mobile terminal 110 will successfully receive the data packet even if the header of the packet is not masked.

Upon receiving the data packets from the CPU 160, the server 150 detects that the data packets are to be transmitted to the mobile terminal 110 based on the destination address identified in the original header of the data packets. The database of the server 150 can also include, for each mobile terminal 110, a designation of whether the mobile terminal 110 is to receive the data packets via a carrier network that restricts the transmission or reception of data packets converted from audio data. If the mobile terminal 110 is designated to receive the data packets via a carrier network that imposes such a restriction, the server 150 masks the destination port of the data packets to appear as a data receiving port of the mobile terminal 110 that is configured to exchange data with the server 150, similar to the conversion unit 214 of the mobile terminal 110. For example, as shown in FIG. 4, the server 150 can mask the destination port of the data packets by appending a masking header, in which the destination port is changed to port number Y, to the original header of the data packets received from the CPU 160. In addition, the server 150 can also be configured to mask the source port of the data packets to port number X, as shown in the example of FIG. 4. In effect, the server 150 makes the destination port, and possibly the source port, of the data packets appear to be any data destination and source port that is not associated with transferring audio data converted from voice data. For example, the server 150 can change the destination port, and possibly the source port, of the data packets to be received by the mobile terminal 110 to a port associated with a web browser or email program resident on the mobile terminal 110.

The server 150 then transmits the data packets having the masked destination port, and possibly a masked source port, to the mobile terminal 110 via the communication network 120 by means of the cellular network 130 or satellite network 140. The server 150 transmits the data packets to the mobile terminal 110 on the data network of the cellular or satellite carrier, similar to how the mobile terminal 110 transmits data packets over the carrier network. As described above, the mobile terminal 110 and the server 150 send data packets to each other and receive data packets from each other across the communication network 120 via an IP protocol, such as TCP/IP, for example.

Since the server 150 is configured to mask the destination port, and possibly the source port, of data packets to be received by the mobile terminal 110 according to the exemplary system of the present disclosure, legacy radio systems designed to receive and transmit audio data over the communication network 120 do not need to be modified to overcome the constraints imposed by cellular and satellite carrier networks on transmitting and receiving data packets converted from audio data. Instead, the CPUs 160 of the legacy radio systems can transmit the converted data packets to the server 150, which serves as a centralized interface between the mobile terminal 110 and the CPUs 160. Accordingly, the CPUs 160 respectively corresponding to the RF transceivers 180 can continue to transmit the data packets to a destination address without requiring modification of their communication capabilities.

Alternatively, the CPUs 160 can be configured to perform the above-described data masking operation of the server 150. The CPU 160 can be configured to mask the destination port of the data packets to appear as a data receiving port of the mobile terminal 110 that is configured to exchange data with the server 150. In addition, the CPUs 160 can be configured to mask the source port with a source port associated with the server 150 or CPU 160 exchanging data packets other than digitized data converted from voice data with the mobile terminal 110. In this case, the server 150 can route the data packets received from the CPU 160 to the mobile terminal 110.

The data packets having the masked destination port, and possibly the masked source port, are received by the reception unit 216 of the mobile terminal 110 via the communication network 120 by means of the cellular carrier network 130 or satellite network 140. The control unit 213 recognizes that the server 150 transmitted the data packets based on the source address identified in the masking header of the data packets. Upon receiving the data packets, the control unit 213 strips (removes) the masking header from the data packets to reveal the original header, similar to the above-described operation of the server 150. The control unit 213 then activates the conversion unit 214 to decode the converted data packets into analog audio data representing the half-duplex radio communication transmitted from the RF transceiver 180 to the CPU 160. The control unit 213 then activates the audio output unit 250 by causing a predetermined voltage to be applied to the audio output unit 250, and transmits the analog audio data to the audio output unit 250 to output the half-duplex radio communication via the speaker. In the case where the data packets received from the server 150 contain data such as a facsimile communication transmitted as a radio communication, the control unit 213 activates the display unit 240 to display the facsimile communication by causing an appropriate voltage to be applied thereto, and transmits the facsimile communication to the display unit 240.

Accordingly, in the exemplary system 100 illustrated in FIG. 1, the mobile terminal 110 is configured to communicate with a plurality of RF transceivers 180 via two-way radio over the communication network 120. The system 100 therefore provides a number of advantageous aspects. For instance, the range of communication between the mobile terminal 110 and the RF transceivers 180 is not geographically limited. Thus, the mobile terminal 110 can communicate with RF transceivers 180 located anywhere in the world, and vice versa, because the corresponding CPUs 160 of the RF transceivers 180 are connected to the communication network 120. In addition, the communication channels or frequency bands used by the mobile terminal 110 and the RF transceivers 180 need not be compatible with each other. The exemplary system 100 is frequency agnostic because the radio communications originating from the mobile terminal 110 and RF transceivers 180 are converted into digital data packets, transmitted over the communication network 120 and then decoded back into a radio communication. Another advantage is that mobile terminals 110 can communicate via two-way radio with existing legacy radio systems. Thus, enterprises can continue to use their legacy equipment to achieve the expanded communication ability of communicating with mobile terminals 110 without regard to geographic or channel constraints.

In addition, mobile terminals 110 connected to wireless voice and data service carriers such as cellular or satellite carriers are enabled to perform two-way radio communications with any existing radio system connected to the communication network 120 without being constrained by port restrictions of the carriers. The mobile terminals 110 transmit and receive data packets representing half-duplex radio communications on the data network of the cellular or satellite carrier. This is different from conventional cellular walkie-talkie services, in which half-duplex radio communications are transmitted and received on the voice network of the cellular carrier. Accordingly, in the exemplary system 100, the traffic of half-duplex radio communications between the mobile terminal 110 and the CPUs 160 appears as any form of data to the carriers, such as a web page or email, for example. For consumers, this can result in lower monthly fees for using the carrier's services, because wireless carriers typically charge graduated fees based on the total number of minutes used for voice services, but charge flat rate fees for data services. In addition, in the event of an emergency, when cellular or satellite voice services may be flooded or preempted, data services of the carriers may still be available, and thus, the mobile terminals 110 can continue to communicate with the RF transceivers 180 without regard to the current state of the voice services of the carrier network.

In the example of FIG. 1, the mobile terminal 110 is described as being connected to the communication network 120 via a cellular base station 130 and/or satellite 140 of a satellite network. The present disclosure is not limited thereto. The mobile terminal 110 may be connected to the communication network 120 via any wired or wireless connection medium, such as a dedicated network connection line (e.g., dial-up and Ethernet- or USB-based broadband connection), a wi-fi connection and a wi-max connection, for example.

The input unit 230 is described above as receiving the operator's designation of the recipient user, workgroup or RF transceiver 180 of the half-duplex radio communication originating from the mobile terminal 110. The present disclosure is not limited thereto. The mobile terminal 110 may be configured to provide the feature of voice-activated designations of the recipient. In particular, the audio input unit 220 can receive an audible designation of the recipient of the radio communication by the operator speaking the name or other identification information of the recipient into the audio input unit 220. In this case, the ROM 211 could be equipped with a voice-recognition program that permits the control unit 213 to recognize the recipient based on the operator's voice-activated designation. In addition, the mobile terminal 110 may be configured to enable the operator to designate that he or she wishes to initiate a half-duplex radio communication by issuing a verbal PTT command, and terminating the radio communication by issuing a verbal PTT release command by means of the audio input unit 220. The control unit 213 can recognize these commands by using the voice-recognition program resident on the ROM 211.

Figure 5:
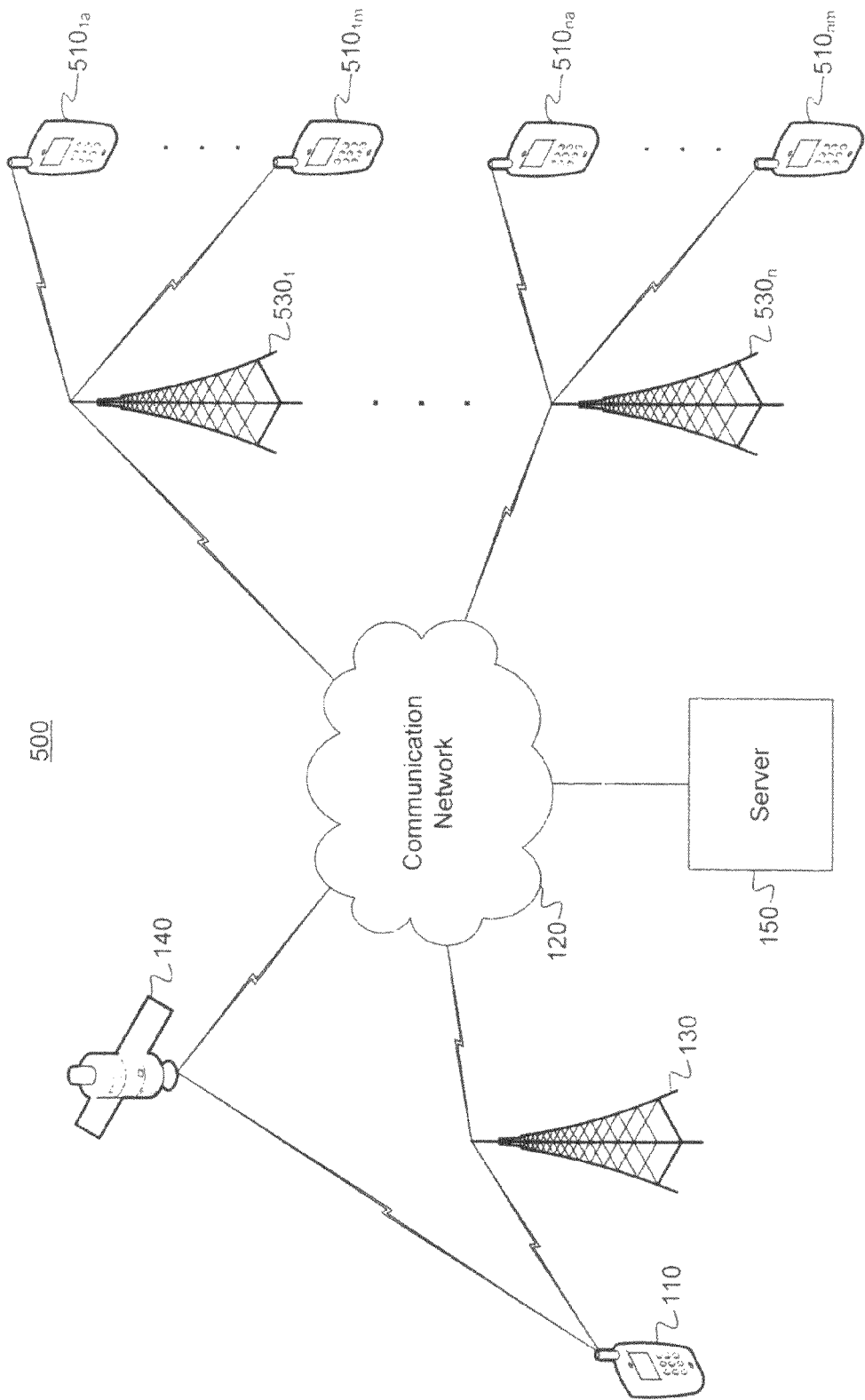
FIG. 5 is a block diagram illustrating a system according to an exemplary embodiment.

FIG. 5 is a diagram illustrating another exemplary system 500 of the present disclosure in which the mobile terminal 110 is configured to communicate with one or more other mobile terminals 510 via two-way radio over the communication network 120. The components of the system 500 having the same reference numerals as those of FIG. 1 perform similar functions to those components of the system 100.

As shown in FIG. 5, mobile terminals $510_{1a}$ to $510_{1m}$ are serviced by base station $530_1$ of a cellular carrier network, and mobile terminals $510_{na}$ to $510_{nm}$ are serviced by base station $530_n$ of the cellular carrier network. If the operator of one of the mobile terminals 510 travels to another location serviced by another base station 530 of the cellular carrier network, such mobile terminal will then be serviced by the other base station 530. As known in the art, mobile terminals having a cellular communication capability are serviced by the nearest base station with which the mobile terminal establishes a reliable wireless connection. Accordingly, it is to be understood that the service relationships between the mobile terminals 510 and the base stations 530 are dynamically set based on the physical location of each mobile terminal 510 relative to the locations of the base stations 530. Alternatively or in addition to being serviced by a cellular carrier network, the mobile terminals 510 can also be configured to communicate via a satellite network, similar to the mobile terminal 110. The mobile terminals 110, 510 can be serviced by different carrier networks from each other.

The mobile terminals 510 are configured to perform the same functions of the mobile terminal 110 in transmitting and receiving two-way radio communications over the communication network 120 via the server 150 to/from one or more of the other mobile terminals 110, 510. In particular, each mobile terminal 110, 510 is configured to receive a half-duplex radio communication as an analog audio input, convert the received radio communication into one or more digital data packets, and transmit the data packets to one or more other mobile terminals 110, 510 through the server 150 via the communication network 120.

The following describes exemplary features of the present disclosure concerning a two-way radio communication between mobile terminal 110 and mobile terminal 510 linked to each other through the communication network 120 and server 150. The following description assumes, for example, that the operator of mobile terminal 110 initiates a radio communication (first radio communication) with the operator of mobile terminal 510, and the operator of mobile terminal 510 replies with a radio communication (second radio communication) to the operator of mobile terminal 110. The operator of mobile terminal 110 initiates the first radio communication by inputting a command input to the input unit 230 illustrated in FIG. 2. The command input includes a transmit command to transmit the first radio communication to the mobile terminal 510, and the network or IP address of the server 150. In particular, the operator of mobile terminal 110 specifies in field 304 of the user interface (see FIG. 3) that the first radio communication is to be received by mobile terminal 510. In the user interface illustrated in FIG. 3, the operator of mobile terminal 110 can manually enter the operator of mobile terminal 510 or select the operator of mobile terminal 510 from a drop-down list of pre-recorded recipients. The operator of mobile terminal 110 can also specify the mobile terminal 510 as the recipient device, instead of the name of the operator of mobile terminal 510, if desired. Once the command input including a transmit command to transmit the first radio communication to the desired mobile terminal 510 has been inputted, and the network address of the server 150 is entered if it is not already preprogrammed or automatically entered, the operator of mobile terminal 510 then presses and holds the PTT button 308 for the duration of the first radio communication. The control unit 213 then activates the audio input unit 220 by applying an appropriate voltage to the microphone. The received analog audio is captured and processed in the control unit 213, which causes the captured analog data to be stored temporarily for conversion into one or more digital data packets by the conversion unit 214.

The conversion unit 214 of the mobile terminal 110 then converts the analog audio data of the half-duplex radio communication into one or more data packets, in the same manner as described above. Since the mobile terminal 110 is connected to the communication network 120 and the server 150 by a carrier network that may block source and destination ports for packet data that has been converted from voice data, according to the example of FIG. 5, the conversion unit 214 then masks the destination port, and possibly the source port, of the data packets, similar to the example illustrated in FIG. 4. In this case, the destination address of the data packets in the original data packet will designate the unique address or identifier of the mobile terminal 510. However, since the converted data packets having the masked destination port, and possibly a masked source port, are to be received by the server 150 and then routed to the mobile terminal 510, the conversion unit 214 identifies the IP or network address of the server 150 as the destination address in the masking header.

The server 150, upon receiving the data packets from the mobile terminal 110, strips the masking header from the data packets, and determines that the data packets are intended to be received by the mobile terminal 510 based on the destination address included in the original header of the data packet. In the exemplary system 100 described above, the server 150 transmits the data packets received from the mobile terminal 110 to the CPU(s) 160 corresponding to the RF transceiver(s) 180 that is/are to receive the data packets after the server 150 strips the masking header from the received data packets. However, in the exemplary system 500, since the mobile terminal 510 is, according to the example of FIG. 5, configured to receive the data packets via a carrier network such as a cellular carrier and/or satellite carrier, the carrier network may block the data packets from being received by the mobile terminal 510, since the original header of the data packets indicates a source port and a destination port associated with a voice-to-digital data conversion application.

The server 150 detects whether the mobile terminal 510 is to receive the data packets via a carrier network that may block data packets converted from audio data by referring to the above-described database. If the server 150 determines that the mobile terminal 510 is to receive the data packets via a carrier network that imposes such a restriction, the server 150 masks the destination port of the data packets to appear as a data receiving port of the mobile terminal 510 configured to exchange data with the server 150. In addition, the server 150 can also mask the source port of the data packets, as described above.

Figure 6:
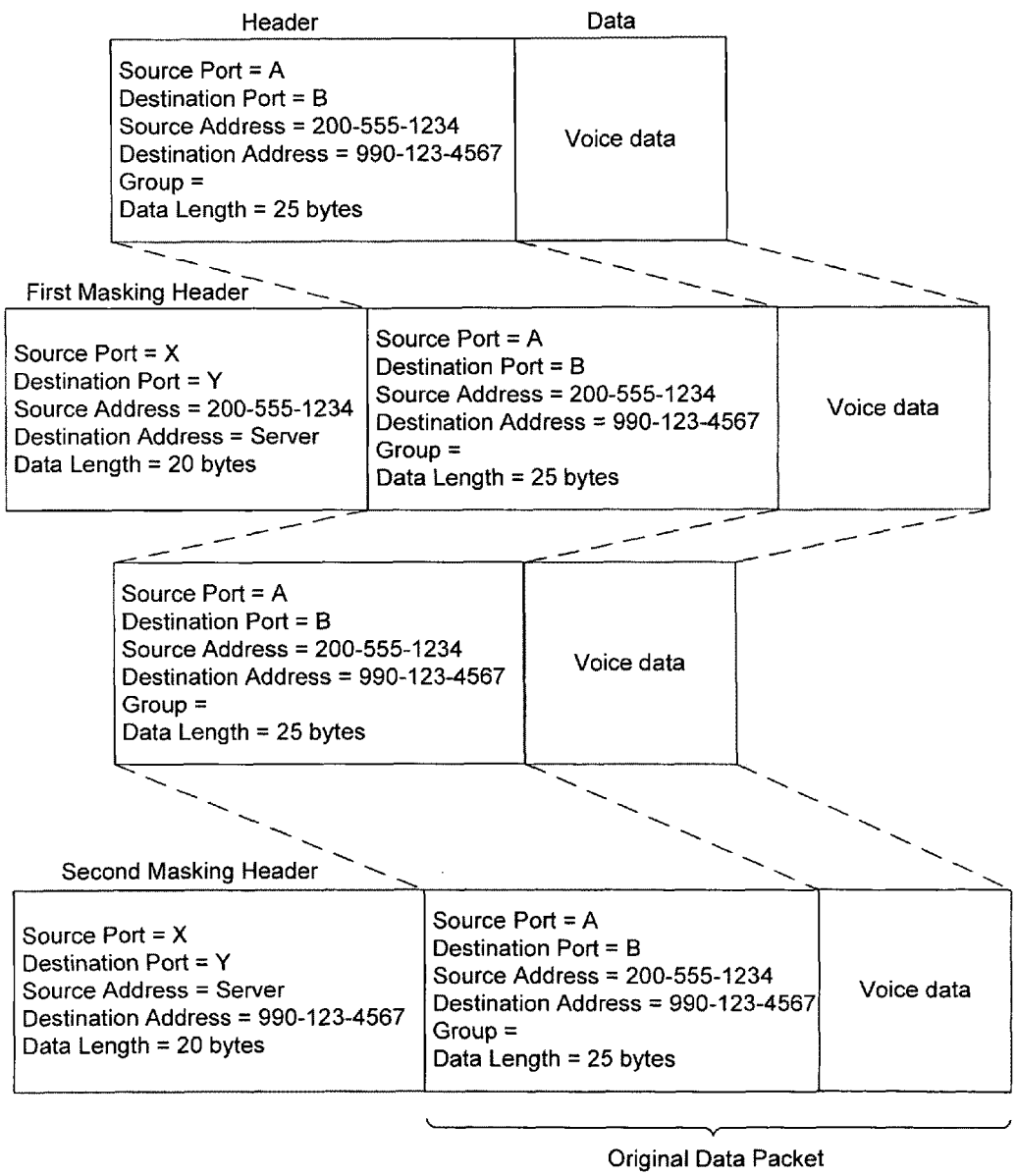
FIG. 6 is a diagram illustrating a sequence of masking data packets according to an exemplary embodiment.

FIG. 6 illustrates a sequence diagram of data masking that is performed in the exemplary system 500 when the mobile terminal 110 transmits a half-duplex radio communication, in the form of digital data packets, to the mobile terminal 510, in the situation where both mobile terminals 110, 510 are configured to communicate via a carrier that places constraints on the types of data that can be distributed in the carrier network. The broken lines included in FIG. 6 denote the correspondence between the various data packets during the illustrated data masking sequence. The sequence illustrated in FIG. 6 includes four distinct operations. First, the conversion unit 214 of the mobile terminal 110 converts the first radio communication into one or more data packets. In the example described above, the mobile terminal 110 is transmitting the first radio communication, as one or more data packets, to the mobile terminal 510. Accordingly, when the conversion unit 214 converts the first radio communication into the data packets, the conversion unit 214 specifies the source address of the mobile terminal 110 and the destination address of the mobile terminal 510 in the header of the packet. In the example of FIG. 6, the source address of the mobile terminal 110 is identified as its mobile telephone number "200-555-1234", and the destination address of the mobile terminal 510 is identified as its mobile terminal "990-123-4567." Alternatively, the mobile terminals 110 and 510 can be respectively identified by another one of their unique addresses and identifiers, such as the IP address, ESN, MIN, IMEI or other unique identifier that is assigned to the mobile terminal by the carrier network or the manufacturer thereof.

By using a predetermined codec to convert the received first radio communication into the digital packets, the source port and the destination port of the data packets of the first radio communication are initially identified as ports associated with a voice-to-digital data conversion application, by convention. For example, the source and destination ports are initially designated as port numbers A and B by convention, respectively, as illustrated in FIG. 6. However, since cellular and satellite carriers regularly block such ports, the conversion unit 214 of the mobile terminal 110 masks the data packets by appending a new header onto the converted packet. As shown in FIG. 6, a first masking header, in which at least the destination port has been changed to port number Y, is appended to the original header of the data packets converted from the first radio communication. In addition, the source port can also be changed to port number X in the first masking header. The conversion unit 214 can change the destination port as well as the source port of the data packets to any data transfer port of the mobile terminal 110 that is not associated with transferring audio data converted from voice data.

The transmission unit 215 of the mobile terminal 110 then transmits the data packets having the first masking header to the server 150. Upon receiving the data packets having the first masking header, the server 150 strips the first masking header and determines that the packets are to be received by the mobile terminal 510 based on the destination address included in the original header. The server 150 then determines whether the mobile terminal 510 is to receive the data packets via a carrier network that may block data packets converted from audio data by referring to the above-described database. In the present example, the server 150 determines that the mobile terminal 510 is to receive the data packets via a cellular carrier network that imposes such a restriction. Consequently, the server 150 masks the original header of the data packet by appending a second masking header to the original header. As shown in FIG. 6, the server 150 masks the destination port of the data packets to appear as a data receiving port of the mobile terminal 510 configured to exchange data with the server 150. In addition, the server 150 can also mask the source port of the data packets, as described above. As shown in FIG. 6, the IP or network address of the server 150 is specified as the source address and the unique address or identifier of the mobile terminal 510 is specified as the destination address in the second masking header.

The server 150 then transmits the data packets having the second masking header to the mobile terminal 510. Upon receiving the data packets, the mobile terminal 510 strips the second masking header to reveal the original header, similar to the above-described operation of the server 150. The control unit 213 of the mobile terminal 510 then activates the conversion unit 214 to decode the converted data packets into analog data representing the first radio communication transmitted from the mobile terminal 110. The control unit 213 of the mobile terminal 510 activates the audio output unit 250 by causing a predetermined voltage to be applied to the audio output unit 250, and transmits the analog audio data to the audio output unit 250 to output the first half-duplex radio communication via the speaker. In the case where the data packets received form the server 150 contain data such as a digitized image representing a facsimile communication that is transmitted as a radio communication, the control unit 213 activates the display unit 240 to display the facsimile communication by causing an appropriate voltage to be applied thereto, and transmits the facsimile communication to the display unit 240.

The mobile terminal 510 can then reply to the first radio communication by transmitting a second radio communication to the mobile terminal 110. The reception, conversion and transmission of the second radio communication from the mobile terminal 510 is performed in the same manner as the reception, conversion and transmission of the first radio communication transmitted from the mobile terminal 110 as described above. Accordingly, a redundant description will not be made.

The mobile terminals 110, 510 and server 150 each transmit and receive the data packets across the communication network 120 by using an IP protocol, such as TCP/IP, for example. Using the TCP/IP protocol provides an advantage of ensuring establishment of a connection between the devices involved in a communication, and ensuring the subsequent transmission and receipt of the data packets through the synchronization and acknowledgement features of the TCP/IP protocol.

The mobile terminals 110, 510 are each configured to transmit a half-duplex radio communication, as one or more data packets, to one or more other mobile terminals via the server 150 and communication network 120. The operator of the mobile terminal 110, 510 can transmit a half-duplex radio communication to one or more other mobile terminals by individually specifying each recipient mobile terminal, or by transmitting a half-duplex radio communication to one or more groups of mobile terminals. In the example of FIG. 3 described above, the operator of mobile terminal 110 selected the group of nurses in Hospital #1 in Dallas, Tex. to receive the half-duplex radio communication. The concept of groups for a plurality of mobile terminals is similar to groups of RF transceivers, except that groups of mobile terminals may not be classified by a particular channel or frequency band. This is because, according to the present disclosure, each mobile terminal 110, 510 transmits and receives data packets, which are converted from half-duplex radio communications, to/from the server 150 via the communication network 120. Consequently, the RoIP communication capabilities of each mobile terminal 110, 510 are agnostic to over-the-air frequencies.

For example, the operator of mobile terminal 110 can designate the operator of mobile terminal $510_{1a}$ and the operator of mobile terminal $510_{na}$ as a group that is to receive a half-duplex radio communication from the mobile terminal 110 via the server 150. In operation, the operator of mobile terminal 110 specifies that a half-duplex radio communication is to be transmitted to this group of recipient mobile terminals by designating this group of recipient mobile terminals in the above-described user interface displayed on the display unit 240 of the mobile terminal, as the command input to transmit the half-duplex radio communication. The number of mobile terminals 110, 510 that can be included in a group is not limited. In addition, the mobile terminals 110, 510 can be configured to transmit a half-duplex radio communication, as one or more digitized data packets, to more than one group each including a plurality of mobile terminals via the communication network 120 and server 150.

To facilitate transmission of a half-duplex radio communication to a group of recipient mobile terminals, the mobile terminals 110, 510 can be configured to receive, as the command input, a designation of each recipient mobile terminal in the group and/or the destination address thereof. In addition, the mobile terminals 110, 510 can each include an operator-definable database in which operator-defined groups are stored. The operator-definable database can be stored in a memory of the mobile terminal, such as in the ROM 211 or in a memory card that can be inserted into the memory slot 270, for example. Each operator-defined group can include a list of mobile terminals belonging to the group in respective association with the unique identifier of each mobile terminal in the group. As an alternative to receiving an input of the name and/or unique identifier of each recipient mobile terminal in a group, the mobile terminals 110, 510 can be configured to receive a designation, by the operator, of a group of mobile terminals that are to receive a half-duplex radio communication. Based on the inputted group designation, the control unit 213 of the transmitting mobile terminal can then look up the unique identifier of each mobile terminal included within the recipient group in the operator-defined database. Then, when the conversion unit 214 converts the half-duplex radio communication into one or more data packets, the control unit 213 can instruct the conversion unit 214 to populate the destination address field of the header of the data packets with the destination address of each mobile terminal in the group. The mobile terminals and/or the operators of the mobile terminals in the group can be identified in a window 312 in the user interface illustrated in the example of FIG. 3.

In the example of FIG. 6, the original header of the data packets transmitted from the mobile terminal 110 to the server 150 contains a "group" field in which a group of destination mobile terminals can be designated. The "group" field is blank in FIG. 6, because in the example used to describe the data masking sequence, mobile terminal 110 transmitted a half-duplex radio communication, as one or more data packets, to mobile terminal 510 via the server 150 and communication network 120. The mobile telephone number of mobile terminal 510 is identified in the destination address field of the example of the header as illustrated. Thus, in FIG. 6, the unique identifier of the mobile terminal 510 is identified as the destination address and the "group" field is blank, because the destination address of mobile terminal 510 is known and is therefore identified in the destination address of the original header. If the operator identifies a group of recipient mobile terminals by utilizing the aforementioned operator-definable database or individually enters the unique identifier of each mobile terminal in a group of mobile terminals that are to receive a half-duplex radio communication, the identifiers of each mobile terminal in the group can be individually designated in the original header of the data packets converted by the conversion unit 214 so that the server 150 can determine the recipient mobile terminals.

However, in the event that the operator of a mobile terminal desires to send a half-duplex radio communication to a group of mobile terminals, it is conceivable that the operator of the transmitting mobile terminal is not aware of every operator or mobile terminal within a given group. For example, assume that an operator of a mobile terminal in Pittsburgh, Pa. desires to send a half-duplex radio communication to the respective mobile terminal of each nurse in Hospital #1 in Dallas, Tex. Unless the operator in Pittsburgh is aware of each nurse in Hospital #1 and the respective unique identifier of each nurse's mobile terminal, the radio communication transmitted from the mobile terminal of the operator in Pittsburgh may not be transmitted to all the respective mobile terminals of the nurses in Hospital #1 in Dallas.

In view of this concern, operators of mobile terminals registered with the server as well as other entities may register the unique identifiers of each mobile terminal for a variety of groups of interest in the database of the server 150. For example, the unique identifiers of each mobile terminal in Hospital #1 can be registered in the database under a variety of different and overlapping groups. Thus, as an alternative to the operator of the transmitting mobile terminal having to enter the unique identifier of each mobile terminal of a group of mobile terminals that are to receive a half-duplex radio communication, the operator of the transmitting mobile terminal can designate the name of a group registered in the server 150. For example, the operator in Pittsburgh can designate, in the command input, the group of nurses in Hospital #1 in Dallas as the recipient group, and the recipient group will be identified in the group field of the original header of the data packets transmitted to the server 150. The server 150, upon receiving the data packets, strips the masking header and detects the name of the group in the original header. The server 150 then searches the database to find the destination address of each mobile terminal in that group, designates the destination address of each mobile terminal in the (second) masking header generated by the server 150, and then transmits the data packets to each mobile terminal in the group. The database entries stored in the server 150 of the destination addresses of group members can, of course, be updated to reflect modifications to the registered groups.

Accordingly, the exemplary system 500 provides multicasting to a predetermined or unlimited number of recipients, and allows a predetermined or unlimited number of mobile terminals on one radio conversation at the same time. Consequently, the exemplary system 500 advantageously provides unlimited group multicasts to an unlimited number of operators. This technique offers operators of mobile terminals 110, 510 a considerable advantage, because it renders costly multicast WANs unnecessary.

In addition, the exemplary system 500 enables mobile terminals 110, 510 connected to wireless voice and data service carriers such as cellular or satellite carriers to perform two-way radio communications with each other without being constrained by port restrictions imposed by the carriers. As mentioned above, the mobile terminals 110, 510 can be serviced by different carrier networks. Therefore, in contrast to conventional cellular walkie-talkie services, an operator of a mobile terminal serviced by one cellular and/or satellite carrier network can transmit half-duplex radio communications to one or more other mobile terminals serviced by different cellular and/or satellite carrier networks, for example.

The mobile terminals 110, 510 transmit and receive data packets representing half-duplex radio communications on the data network of the cellular or satellite carrier. This is different from conventional cellular walkie-talkie services, in which half-duplex radio communications are transmitted and received on the voice network of the cellular carrier. Accordingly, in the exemplary system 500, the traffic of half-duplex radio communications between the mobile terminals 110, 510 appears as a form of data to the carriers, such as a web page or email, for example. For consumers, this can result in lower monthly fees for using the carrier's services, because wireless carriers typically charge graduated fees based on the total number of minutes used for voice services, but charge flat rate fees for data services. In addition, in the event of an emergency, when cellular or satellite voice services may be flooded or preempted, data services of the carriers may still be available, and thus, the mobile terminals 110, 510 can continue to communicate with each other without regard to the current state of the voice services of the carrier network.

Figure 7:
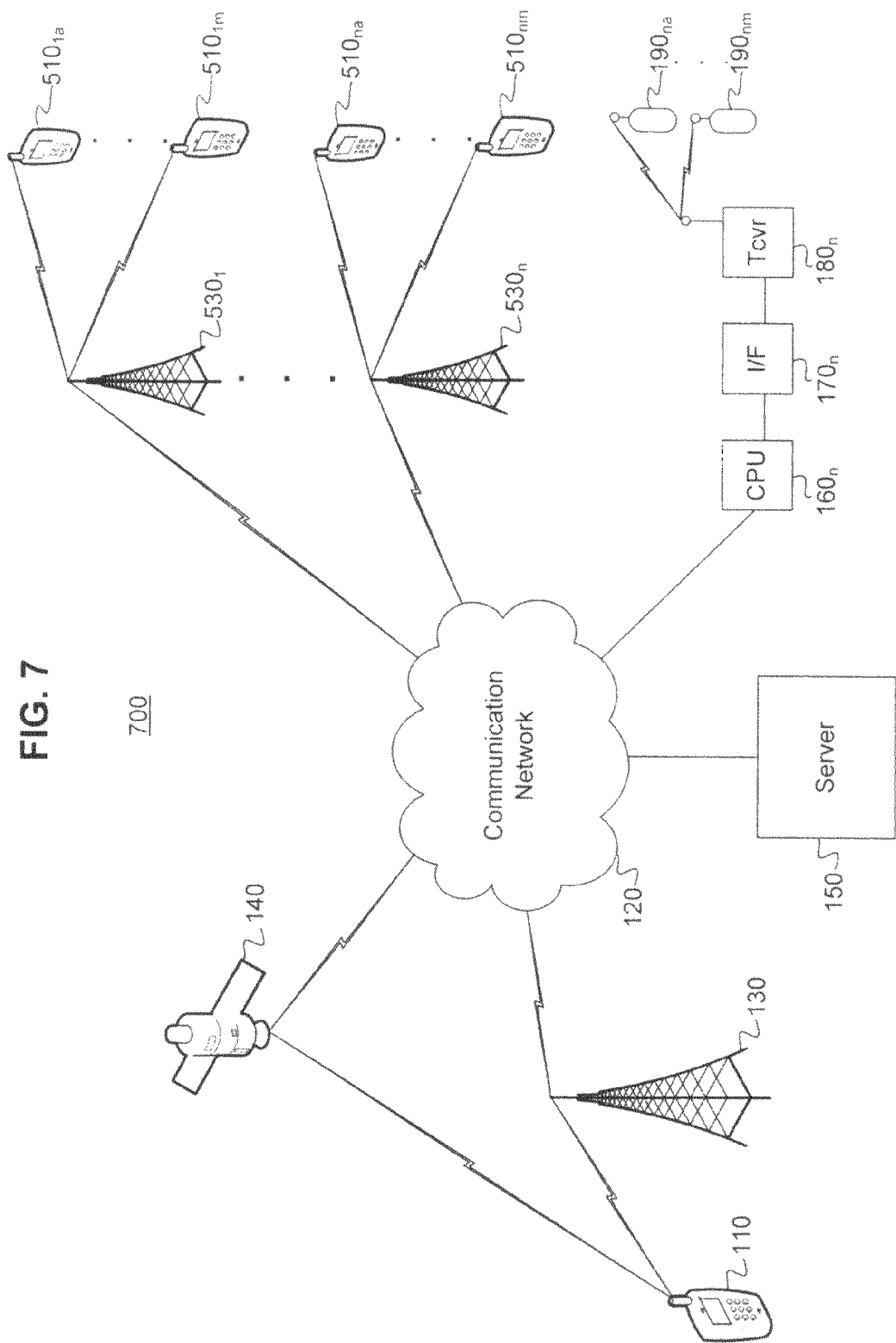
FIG. 7 is a block diagram illustrating a system according to an exemplary embodiment.

In the exemplary system 100 illustrated in FIG. 1, the mobile terminal 110 is configured to communicate with a plurality of RF transceivers 180 via two-way radio over the communication network 120. In the exemplary system 500 illustrated in FIG. 5, the mobile terminal 110 is configured to communicate with a plurality of other mobile terminals 510 over the communication network. The advantageous aspects of these two exemplary systems can be combined, as illustrated in FIG. 7. Accordingly, the mobile terminals 110, 510 connected to wireless voice and data service carriers such as cellular or satellite carriers are enabled to perform two-way radio communications with any existing radio system or other mobile terminals connected to the communication network 120 without being constrained by port restrictions of the carriers. The mobile terminals 110, 510 can communicate with any number of mobile terminals and legacy radio systems to provide unlimited group multicasts that are not restricted by geographic or radio frequency constraints. In addition, the exemplary system 700 illustrated in FIG. 7 enables an unlimited number of existing radio communication systems and mobile terminals to be linked together without requiring special routing equipment or technological know-how.

Figure 8A:
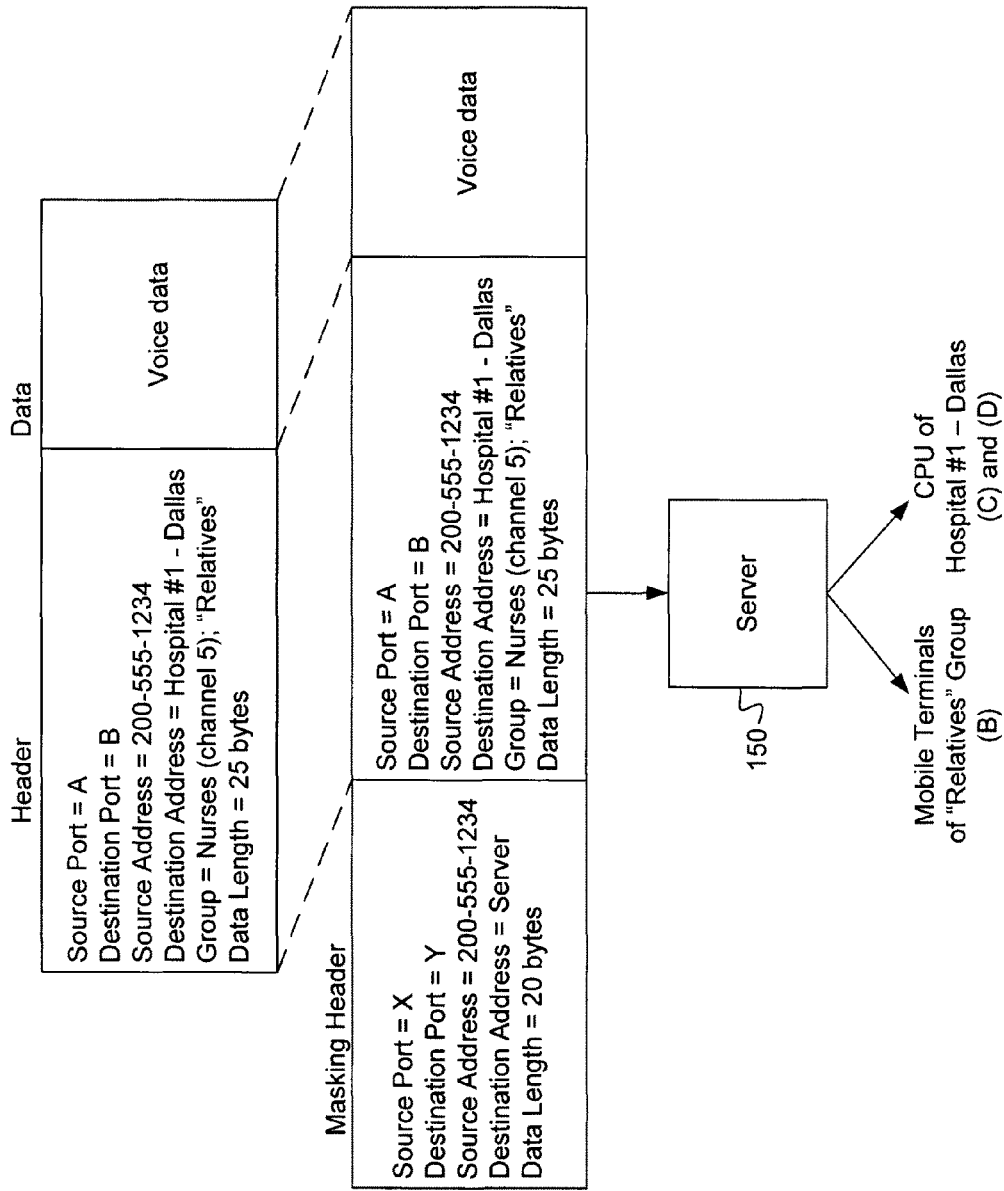

FIGS. 8A-8D are diagrams illustrating a sequence of transmitting and masking data packets according to an exemplary embodiment in which a mobile terminal transmits the data packets to both mobile terminals and legacy RF transceivers. Similar to the example of FIGS. 3 and 4, the operator of the mobile terminal has selected to transmit a half-duplex radio communication to the group of nurses in Hospital #1 in Dallas, Tex. In addition, the operator of the mobile terminal has selected to transmit the half-duplex radio communication to a group of operators of mobile terminals that are relatives of the operator of the transmitting mobile terminal. Thus, the operator of the transmitting mobile terminal has selected to multicast the half-duplex radio communication to the nurses in Hospital #1 in Dallas as well as his or her relatives. In the example of FIG. 8A, the operator has registered the respective unique identifiers of the mobile terminals belonging to the group of "relatives" in the database of the server 150. Accordingly, in the original header shown in FIG. 8A, the group name "Relatives" is identified in the group field of the data packets converted by the conversion unit 214, in addition to the group of nurses in Hospital #1 in Dallas. In this example, the mobile terminal is configured to transmit the data packets to the server 150 via a carrier network that may block source and destination ports for packet data that has been converted from voice data. Accordingly, as shown in FIG. 8A, the conversion unit 214 of the mobile terminal appends a masking header to the original header of the data packets in which the destination portion, and possibly the source port, of the original header are modified to circumvent the port restrictions imposed by the carrier network. Since the masking operations performed by the conversion unit 214 have already been described, a repeated description will not be provided.

The server 150 then receives the data packets having the masking header. In the present example, the audio data packets transmitted from the operator's mobile terminal are being multicast to two groups: (1) the mobile terminals within the group "relatives", and (2) to the mobile terminals and/or radio terminals within the group of the nurses in Hospital #1 in Dallas, Tex. The server 150 can be configured to transmit two communications, one for each of these groups. In FIG. 8A, the parenthetical letters (B), (C) and (D) correspond to the illustrations of FIGS. 8B-8D, respectively.

FIG. 8B illustrates a sequence diagram for transmitting the data packets from the mobile terminal of the transmitting operator to the mobile terminals of each member of the group "relatives." As mentioned above, the user group "relatives" is registered in the database of the server 150. Accordingly, the operator of the transmitting mobile terminal can designate, in the command input, the group name "relatives" and the conversion unit will include this group name in the group field of the original header when converting the analog audio data into one or more data packets. In the present example, the mobile terminal of the initiating operator is transmitting the data packets to the server 150 via a carrier network that restricts transmission and reception of data packets having ports associated with an application program that converts analog audio data into data packets. Accordingly, the conversion unit 214 of the mobile terminal appends a first masking header to the original header of the data packets, as shown in sequence (1) of FIG. 8B.

Then, as shown in sequence (2) of FIG. 8B, the server 150, upon receiving the data packets, strips the first masking header to reveal the original header of the data packets, in the same manner as described above.

The server 150 then looks up the unique identifiers and destination address of each mobile terminal in the group "relatives" in its database. In the present example, the server 150 determines that the mobile terminals within the group "relatives" are each designated to receive the data packets via a carrier network that imposes restrictions on transmitted analog audio data converted into digital packets. Accordingly, as shown in sequence (3) of FIG. 8B, the server 150 appends a second masking header to the original header of the data packets. The server designates the unique identifier of each mobile terminal in the group "relatives," and transmits the data packets having the second masking header to each mobile terminal in this group. The mobile terminals in this group then strip the second masking header to reveal the original header, convert the data packets into analog audio data, and output the converted analog audio data as a half-duplex radio communication, in the same manner as described above.

Concurrent to the processing illustrated in FIG. 8B, the server 150 also processes the data packets received from the initiating mobile terminal to be transmitted to the RF transceiver servicing Hospital #1 in Dallas, Tex. Sequence (1) of FIG. 8C illustrates the operation of the conversion unit 214 in appending a masking header to the original header of the data packets. In sequence (2) of FIG. 8C, the server 150 strips the masking header from the data packets to reveal the original header of the data packets. The server 150 then determines the destination addresses of the data packets included in the original header. In the present example, the server 150 determines that the data packets are to be transmitted to the CPU corresponding to the RF transceiver servicing Hospital #1 in Dallas, as well as to the mobile terminals in the group "relatives".

In sequence (3) of FIG. 8C, the server 150 transmits the original data packets to the IP address of the CPU corresponding to the RF transceiver servicing Hospital #1 in Dallas, as well as to the destination addresses of the mobile terminals in the group "relatives". Since the destination address identified in the original header includes an IP or network address for a CPU connected to a RF transceiver via a corresponding interface (e.g., CPU 160$_2$), the server 150 includes a PTT instruction with the original data packets, as shown in sequence (3) of FIG. 8C. The mobile terminals in the group "relatives" are each designated in the database of the server 150 to be presently configured to receive the data packets via a carrier network that imposes restrictions on the distribution of packets converted from analog audio data. As such, the transmission of the data packets to the mobile terminals in sequence (3) of FIG. 8C will not successfully reach these mobile terminals. However, since the data packets are transmitted to these mobile terminals in the concurrent processing illustrated in FIG. 8B, transmission of the data packets to the mobile terminals in the group "relatives" is assured.

If the carrier network is congested, the server 150 can alternatively perform the processing of sequence (3) in FIG. 8D instead of sequence (3) in FIG. 8C. In the sequence (3) of FIG. 8C, the server 150 transmits the data packets to the mobile terminals in the group "relatives," even though the mobile terminals are presently configured to receive the data packets via a carrier network that prevents the transmission of such data. However, if the carrier network is congested, the server can append a PTT header to the original data packets, as shown in sequence (3) of FIG. 8D, in which only the IP or network address of the CPU corresponding to Hospital #1 in Dallas is identified. Accordingly, the data packets having the PTT header appended thereto will be received by only the CPU corresponding to Hospital #1. As such, congestion on the carrier network can be alleviated by not transmitting the data packets to mobile terminals whose carrier network will block the data packets from being successfully transmitted thereto.

The server 150 provides the functionality to link an unlimited number of mobile terminals and RF transceivers to each other and host a virtually unlimited amount of simultaneous two-way radio communications at any time. A half-duplex radio communication between two or more mobile terminals and/or RF transceivers is not a continuous dialog in which a session between the communicating devices is established. The transmission and reception of each half-duplex radio communication via the server 150 includes a plurality of independent communications. Therefore, the server 150 utilizes multithread routines that allow independent and simultaneous connections between multiple mobile terminals 110, 510 and CPUs 160 respectively corresponding to the RF transceivers 180. This functionality of the server 150 is illustrated in FIG. 9.

Figure 9:
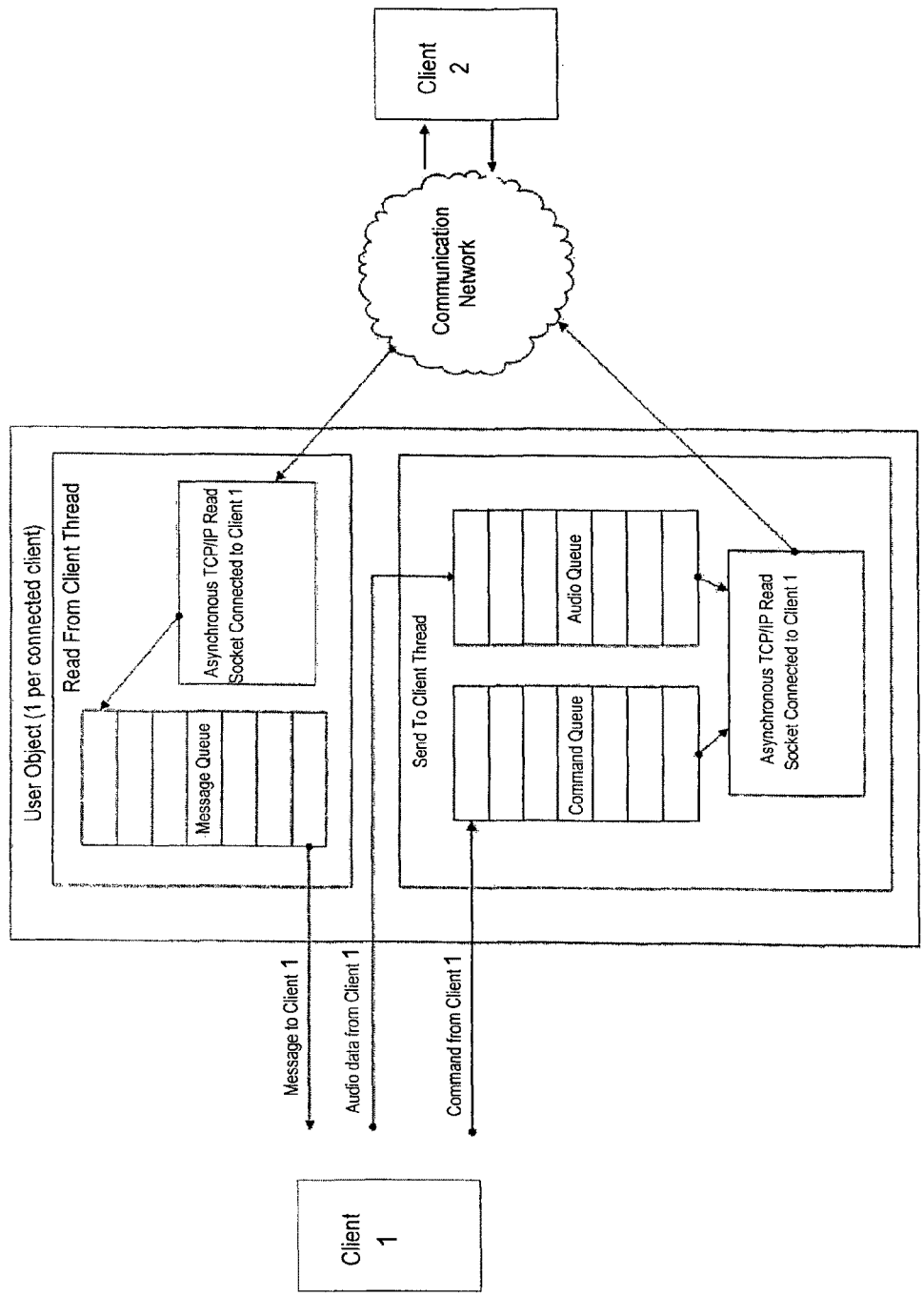
FIG. 9 is a diagram illustrating operative functions of a server according to an exemplary embodiment.

FIG. 9 is a diagram illustrating operative functions of the server 150 according to an exemplary embodiment. The server 150 is configured to operate one "user object" for each connected mobile terminal 110, 510 and/or CPU 160 corresponding to a RF transceiver 180. For clarity of illustration, FIG. 9 illustrates only one "user object". However, it is to be understood that the server 150 is configured to operate a user object for each connected mobile terminal 110, 510 and/or CPU 160 (hereinafter collectively referred to as "clients"). As shown in FIG. 9, each user object includes two threads: a read from client thread, and a send to client thread. The server 150 is configured to operate these threads simultaneously for each connected client. Client 1 and client 2 are illustrated in the example of FIG. 9 to indicate that client 1 receives a communication from client 2, and transmits a communication to client 2 via the server 150. The user object illustrated in FIG. 9 is the user object for client 1 in the server 150. The server 150 also includes a user object for client 2 that functions similar to the user object for client 1.

The send to client thread includes two queues or buffers: a command queue and an audio queue. Upon receiving a communication from client 2 to be received by client 1, the server 150 determines whether the communication is a command or audio data. A command can include a request by a connected client to determine what other clients are presently connected to the server 150, a request for grouping information, a request to initiate a multicast message to a group of connected clients, a request to connect or disconnect, etc. A command can also include information such as requests and/or indications for acknowledging routing information, obtaining link quality information, grouping requests, and other statistical and feature-based information from the connected client. The present disclosure is not limited to the examples of commands described herein. The commands can include any type of communication not considered to be a data packet converted from an analog half-duplex radio communication.

The send to client thread processes commands and audio packet data in separate threads to ensure synchronous processing and transmission of audio data packets. The server 150 is configured to process communications for each client connected to the server 150 individually and simultaneously. However, due to the possibility of congestion in the carrier network through which the clients are connected to the server 150, the server 150 can be configured to prioritize transmission of audio data packets in the audio queue over transmission of commands in the command queue. The prioritization of audio data packets in the send to client thread ensures that audio data packets are sent in the order that they are to be received by a receiving client. If the carrier network is congested, the server 150 can be configured to delay transmission of the command communications to allow for the audio data packets to be timely transmitted to the recipient client.

The read from client thread includes a message queue or buffer in which a message transmitted from client 1 is received via a read socket of the server 150 connected to client 1. The term "message" is used here to include both commands and audio data packet communications, because the server 150 performs the bifurcated and parallel processing of command and audio data packet communications in the user object for the client receiving the communications. In the example of FIG. 9 illustrating the client object for client 1, client 1 is transmitting a message to client 2 via the server 150. Accordingly, the parallel and bifurcated processing will be performed in the user object of the server 150 for client 2.

The message received from client 1 is received in the read socket connected to client 1 via the IP protocol such as TCP/IP. The read from client thread then sequentially buffers and processes the message. For simplicity, the processed message in the message queue is illustrated in FIG. 9 as being transmitted to client 2. However, it is to be understood that the message to client 2 is first processed in the corresponding user object for client 2 in the server 150, similar to the description above of the send to client thread for client 1. Similarly, if a message is intended to be received by a plurality of clients, the server 150 processes the message in a corresponding user object for each client.

Accordingly, the server 150 utilizes multithread routines that allow independent and simultaneous connections between multiple mobile terminals 110, 510 and CPUs 160 respectively corresponding to the RF transceivers 180. This technique allows multiple clients to link an unlimited number of mobile terminals and/or radio systems and host an unlimited number of individual (i.e., peer-to-peer) or multicast communications.

In addition, the multithread routines of the server 150 interfacing the mobile terminals 110, 510 and legacy RF transceivers 180 enable operators of the mobile terminals 110, 510 and RF transceivers 180 to transmit and receive half-duplex radio communications to each other anywhere in the world without any technological know-how, and ensure timely routing of the communications to the intended recipient(s).

An exemplary embodiment of the present disclosure also provides a computer program that causes a mobile terminal to communicate as a two-way radio with a transceiver and/or another mobile terminal over a communication network via a server. The exemplary program enables commercially available mobile terminals such as PDAs, EDAs, smart phones and cellular telephones, for example, to function as a two-way radio via RoIP.

Mobile terminals such as PDAs, EDAs and smart phones are controlled by an operating system (OS) such as Windows Mobile®, Windows CE®, Palm OS®, Blackberry® device software, Mac OS® and Linux, for example. Mobile terminals such as cellular phones are controlled by software that may be unique to the manufacturer of the cellular phone.

The exemplary program of the present disclosure may be an application program that is operable with an OS of existing mobile terminals. For example, the program can be stored on a computer-readable recording medium and be executed by a processor of the mobile terminal. The computer-readable recording medium may be a memory card that can be inserted into a memory slot of the mobile terminal. For example, the program can be recorded on a memory card that can be inserted into the memory slot 270 of the mobile terminal 110 illustrated in FIG. 2. Alternatively, the program can be downloaded to a mobile terminal via the Internet, for example, and recorded on an internal memory of the mobile terminal. The program of the present embodiment enables commercially available mobile terminals to obtain the two-way radio communication functionality of the above-described exemplary mobile terminals 110, 510.

Figure 10:
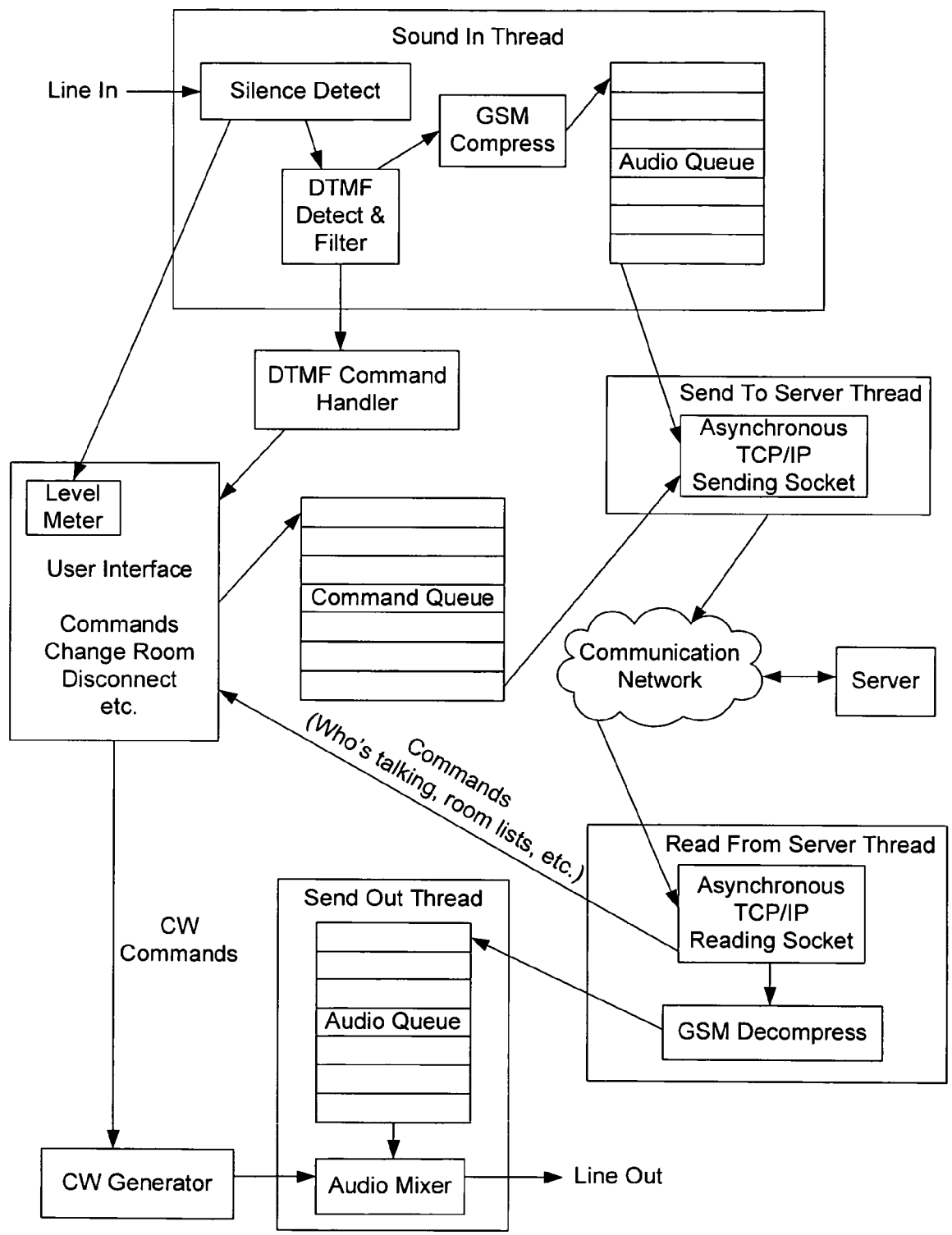
FIG. 10 is a diagram illustrating operative functions of a mobile terminal having a program stored on a computer-readable medium that enables the mobile terminal to communicate as a two-way radio.

FIG. 10 is a diagram illustrating operative functions of a mobile terminal having the program stored on a computer-readable recording medium that enables the mobile terminal to communicate as a two-way radio. The program causes the processor of the mobile terminal to perform multithread routines simultaneously. As illustrated in FIG. 10, one thread includes a sound in thread in which the program causes the processor to detect for silence. If silence is detected, the program causes the mobile terminal to assume that a radio communication is not to be transmitted, and that the operator of the mobile terminal has not inputted a command. The silence detection function interprets an inputted analog signal to determine whether the inputted signal includes a half-duplex radio communication, or whether the signal includes a command relating to the two-way radio communication functionality of the mobile terminal. As described above, such a command can include a request by an operator of the mobile terminal to determine what other clients are presently connected to the server 150, a request for grouping information, a request to initiate a multicast message to a group of connected clients, a request to connect or disconnect, etc. A command can also include information such as requests and/or indications for acknowledging routing information, obtaining link quality information, grouping requests, and other statistical and feature-based information from the connected client. The present disclosure is not limited to the examples of commands described herein. The commands can include any type of communication not considered to be a data packet converted from an analog half-duplex radio communication.

The program includes a routine in which the user of the mobile terminal can designate any input button as a PTT button to initiate a half-duplex radio communication. For example, when the program is first run on the mobile terminal, the program can query the operator of the mobile terminal to assign a particular key of the mobile terminal to function as a PTT button. The program can permit the operator of the mobile terminal to alter the initial assignment of the key that is to function as the PTT button. When the operator presses the assigned key and identifies another mobile terminal, RF transceiver or group of mobile terminal(s) and RF transceiver(s) to receive a half-duplex radio communication, the program then causes the mobile terminal to convert the analog audio signal received from the operator, via a microphone integrated in the mobile terminal or externally connected thereto, into one or more data packets representing a half-duplex radio communication.

The program also includes a routine in which the operator can respectively assign keys on the mobile terminal to represent the above-described commands. For example, the program permits the operator to define that when the keys "4" and "6" are pressed in succession, this combination of keys represents the command to inquire what other clients are presently connected to the server 150. In addition, the program permits the operator to define that when the keys "*", "G" are pressed in succession, this combination of keys represents a command to switch to another group in which the operator of the mobile terminal is registered in the server 150, for example. The program of the exemplary embodiment utilizes dual-tone multi-frequency (DTMF) signaling to detect whether the operator has entered a command assigned to one or more keys. As known in the art, DTMF involves the detection of different frequencies resulting from an operator pressing one or more keys provided on the mobile terminal. The attribution of different frequencies to different keys involved in DTMF is known to those skilled in the art and thus will not be described further.

Accordingly, the silence detect module of the sound in thread continuously listens for an analog signal including audio modulation representing the half-duplex radio communication and a DTMF detection signal based on frequency values of the signals. As illustrated in FIG. 10, the sound in thread includes a DTMF Detect and Filter module which detects whether the analog signals detected by the silence detect module include a DTMF detection signal. If the DTMF detect and filter module does not detect that an inputted signal includes a DTMF detection signal (or a full-duplex cellular telephone call, for example), the program causes the mobile terminal to interpret the inputted signal as a half-duplex radio communication (hereinafter "radio data packets"). The program causes the mobile terminal to convert the modulated analog data into one or more digital data packets representing a half-duplex radio communication (hereinafter "radio data packets"). The program can also cause the mobile terminal to compress the data packets to reduce transmission time over a carrier network and the communication network 120. The compressed radio data packets are then processed and buffered into an audio queue.

On the other hand, if the DTMF detect and filter module detects that the inputted analog signals include a DTMF detection signal, the DTMF detect and filter module routes the DTMF detection signal to a DTMF Command handler module. The DTMF command handler module processes the DTMF detection signal to determine which command is represented by the DTMF detection signal. Upon determining the command based on a Level signal detected by the silence detect module, the command is converted into one or more digital data packets and then buffered into a command queue. The silence detect module can include a sound level meter module that detects the level of audio received from the operator of the mobile terminal based on various factors including the volume of the microphone and the distance of the operator to the microphone, for example. If the detected sound level does not permit for an accurate detection of the incoming analog signals by the silence detect module, or if the detected sound level does not permit for the inputted analog signals to be reproduced recognizably by a recipient device, the silence detect module can cause a message to be displayed on the user interface of the mobile terminal prompting the operator to adjust the volume of the microphone or mobile terminal and/or speak closer to the microphone.

The radio data packets and commands respectively buffered in the audio and command queues are then processed by a send to server thread of the program, in which the radio data packets and commands are transmitted to the server 150 using a socket of an IP protocol such as TCP/IP, for example. Similar to the parallel queues included in the send to client thread of the server 150, as described above, the send to server thread of the program running on the mobile terminal processes commands and radio data packets in separate threads to ensure synchronous processing and transmission of the radio data packets. The send to server thread is configured to process communications to various clients individually and simultaneously. However, due to the possibility of congestion in the carrier network through which the mobile terminal may be connected to the server 150, the send to server thread of the exemplary program can be configured to prioritize transmission of the radio data packets in the audio queue over transmission of commands in the command queue. The prioritization of the radio data packets in the send to server thread ensures that radio data packets are sent in the order that they are to be received by a receiving client. If the carrier network is congested, the send to server thread can automatically, or by control from the operator, delay transmission of the command communications to allow for the radio data packets to be timely transmitted to the server 150. The radio data packets and command communications are transmitted from the send to server thread from the sending socket connection established with the server 150 via the TCP/IP protocol, for example.

The program causes the mobile terminal to convert half-duplex or full duplex radio communications received from the operator of the mobile terminal into one or more data packets. The program can be configured to utilize any lossy or lossless codec to convert the received analog radio communications into one or more data packets. For example, the program can utilize the GSM 6.10 lossy speech compression codec, but other versions of the GSM codec or other codecs may also be used. Thus, by using a predetermined codec to convert the received radio communications into one or more data packets, the source port and destination port of the data packets are initially identified as ports associated with a voice-to-digital data conversion application, by convention. However, as described above, cellular and satellite carriers, for example, regularly block such ports.

Therefore, similar to the exemplary mobile terminals 110, 510 described above, the program running on the mobile terminal can cause the mobile terminal to mask the headers of packets transmitted from the mobile terminal to the sever 150 to circumvent the port restrictions imposed by carrier networks such as cellular and satellite carriers, for example. In particular, the program causes the mobile terminal to mask the destination port of the packets to appear as a data transfer port of the mobile terminal configured to exchange data with the server. For example, the program can cause the mobile terminal to mask the destination port of the packets to appear as a port associated with transferring a website or a port associated with transferring email. In addition, the program can also cause the mobile terminal to change the destination port as well as the source port of the packets to any data transfer port of the mobile terminal that is not associated with transferring data packets converted from audio or voice data. The program can cause the mobile terminal to mask the headers of the data packets similar to the examples illustrated in FIGS. 4, 6 and 8A-8D. The program also causes the mobile terminal to designate the other identification information included in the header denoting the source and destination addresses, group information and data length, among other information, in the manner described above.

Similar to the exemplary mobile terminals 110, 510 described above, the program causes the mobile terminal to transmit the radio data packets and commands on the data network of a carrier network, such as cellular and satellite carriers, for example, to the server 150 via the communication network 120. Thus, the program causes the mobile terminal to transmit radio data packets and command communications over the data network instead of the voice network of the carriers to achieve the aforementioned advantageous aspects.

As described above, the program can cause the operator of the mobile terminal to specify various keys representing the PTT button and other command keys. Similar to the exemplary mobile terminals 110, 510 described above, the program can also include a voice-recognition module permitting the mobile terminal to recognize audible designations of commands and PTT operations by matching the audible designations of the operator with programmed entries.

The exemplary program of the present disclosure includes a read from server thread and a sound out thread for receiving and processing commands and radio data packets from other clients via the server 150 through the communication network 120. As illustrated in FIG. 10, the read from server thread receives commands and radio data packets using a reading socket connection established with the server 150 via an IP protocol such as TCP/IP, for example. The read from server thread includes a module to determine whether the received communications are data packets or commands.

If the module detects that radio data packets are received, the radio data packets are decompressed and routed to a sound out thread of the program. The decompressed radio data packets are buffered in an audio queue and sequentially processed in the sound out thread. The program includes a continuous wave (CW) generator module that causes the mobile terminal to generate an electromagnetic wave of constant amplitude and frequency. The sound out thread includes an audio mixer module. Similar to the exemplary mobile terminals 110, 510 described above, the audio mixer module first causes the mobile terminal to decode the radio data packets back into an analog communication. The audio mixer module achieves this function by converting the radio data packets into analog data and modulating the analog data with the continuous wave generated by the mobile terminal under the control of the CW generator module. Accordingly, the program causes the mobile terminal to convert the digital radio data packets back into an analog half-duplex radio communication to be output from the speaker of the mobile terminal.

The analog half-duplex radio communication includes an audio component. The sound out thread of the program detects the audio component included in the analog half-duplex radio communication, and causes the processor of the mobile terminal to apply an appropriate voltage to an audio output unit of the mobile terminal to activate the audio output unit and cause the audio output unit to output the half-duplex radio communication via a speaker or the like. In the case where the radio data packets received from the server 150 contain data such as a facsimile communication transmitted as a radio communication, the sound out thread of the exemplary program can cause the processor of the mobile terminal to active a display unit of the mobile terminal to display the facsimile communication by causing an appropriate voltage to be applied thereto.

When activating the audio output unit or display unit of the mobile terminal by causing the processor of the mobile terminal to apply an appropriate voltage thereto, the sound out thread can also cause the processor to suppress operation of the various keys assigned to function as the PTT button and command buttons of the mobile terminal, until the half-duplex radio communication is completely reproduced by the audio output unit or display unit, as appropriate.

In the event that a command is received by the read from server thread from the server 150 via the communication network 120, a user interface module of the program performs DTMF signaling detection to determine whether the command corresponds to a DTMF signal representing a command programmed by the operator of the mobile terminal. In case of such correspondence, the CW generator module causes the mobile terminal to modulate the DTMF signal with the CW and output the modulated signal through the audio mixer module. In the event that there is no such correspondence, the user interface module detects the DTMF signal from among preprogrammed DTMF signals to interpret the command received from the server 150, and causes the DTMF signal to be modulated with the CW and output through the audio mixer module.

Figure 11:
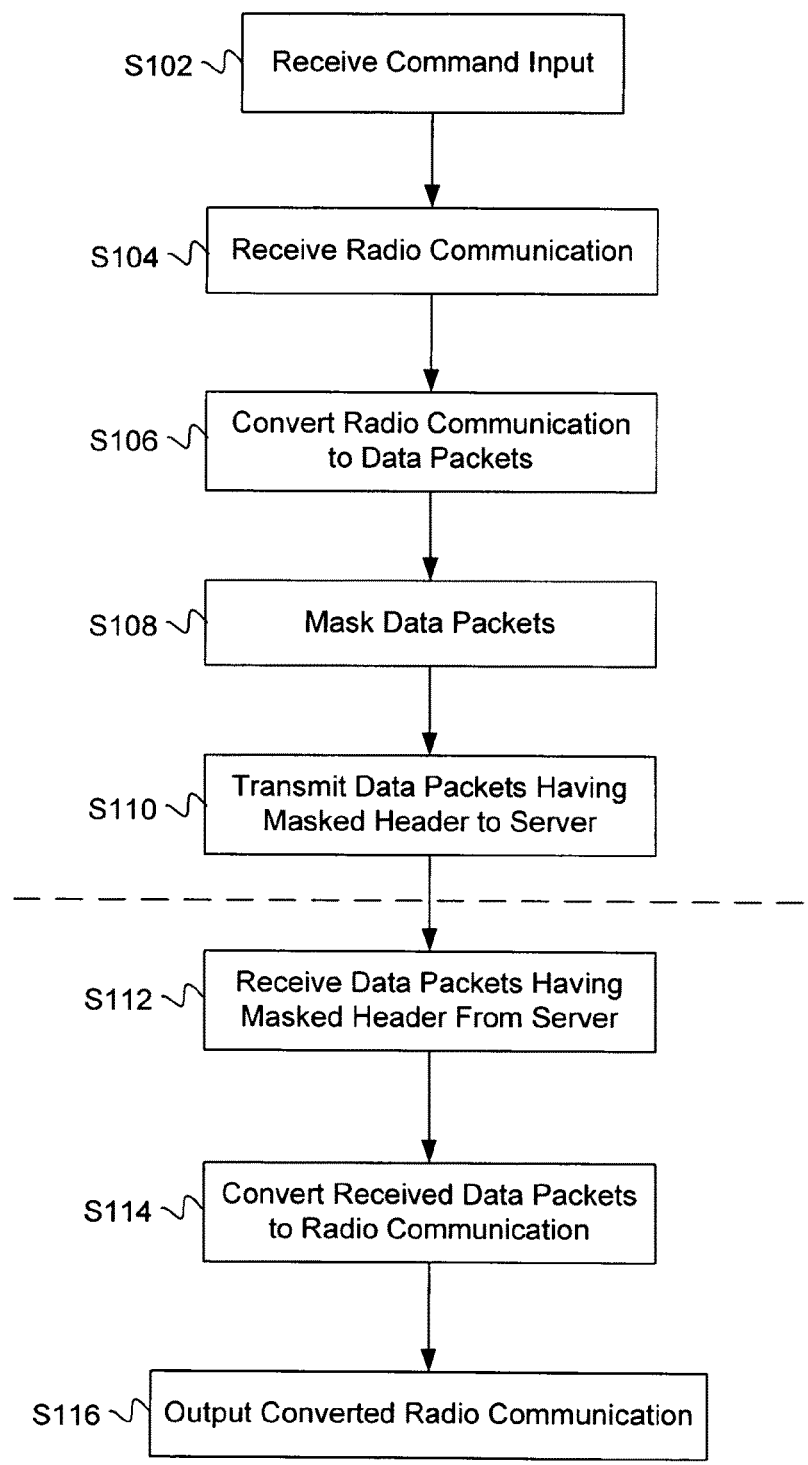
FIG. 11 is a flowchart diagram illustrating operations of a program and method according to an exemplary embodiment.

FIG. 11 is a flowchart diagram illustrating operations of the exemplary program for causing a mobile terminal to function as a two-way radio via a communication network.

The mobile terminal first receives a command input to transmit a half-duplex radio communication to one or more other mobile terminals and RF transceivers (step S102). The command input includes a destination address (or name) of the recipient mobile terminal(s) and RF transceiver(s) along with a network or IP address of the server 150. In particular, when the operator of the mobile terminal indicates that a half-duplex radio communication is to be transmitted, the program causes the mobile terminal to output a user interface through which the operator can input the command input. The user interface illustrated in FIG. 3 is one example of a user interface displayed on the mobile terminal through the control of the program. The program can also be configured to recognize audible designations of the recipient mobile terminal(s) and RF transceiver(s) through a voice-recognition operation.

Upon receiving the command input, the program then prompts the operator to press the assigned PTT button. If the PTT button is a virtual button displayed on the user interface, the program can cause the processor of the mobile terminal to highlight the PTT button to alert the operator. Alternatively, if the PTT button is assigned to a physical key of the mobile terminal, the program can cause the mobile terminal to illuminate the particular key and/or display an indication on the user interface of the mobile terminal to prompt the operator to press the PTT button to initiate a half-duplex radio communication.

Once the operator presses and holds the PTT button, the program causes the processor of the mobile terminal to apply an appropriate voltage to an audio input unit of the mobile terminal to activate a microphone to receive the half-duplex radio communication as an analog audio input, and activate a memory unit of the mobile terminal, such as a RAM, for example, to record the inputted analog audio input (step S104). When the operator terminates the half-duplex radio communication by releasing the PTT button, the program causes the processor of the mobile terminal to generate an analog half-duplex radio communication. The program then causes the processor of the mobile terminal to convert the analog half-duplex radio communication into one or more digital data packets (step S106).

Upon converting the analog half-duplex radio communication into one or more digital data packets, the program then causes the processor of the mobile terminal to mask the destination port of the data packets to appear as a data transfer port of the mobile terminal configured to exchange data with the server (step S108). In particular, the program causes the mobile terminal to mask the destination port of the packets to appear as a data transfer port of the mobile terminal configured to exchange data with the server. For example, the program can cause the mobile terminal to mask the destination port of the packets to appear as a port associated with transferring a website or a port associated with transferring email. In addition, the program can also cause the mobile terminal to change the destination port as well as the source port of the packets to any data transfer port of the mobile terminal that is not associated with transferring data packets converted from audio or voice data. The program can cause the mobile terminal to mask the headers of the data packets similar to the examples illustrated in FIGS. 4, 6 and 8A-8D. The program also causes the mobile terminal to designate the other identification information included in the header denoting the source and destination addresses, group information and data length, among other information, in the manner described above.

The program causes the processor of the mobile terminal to transmit the data packets having the masked header on the data network of a carrier network, such as a cellular or satellite carrier, for example, similar to the above-described exemplary embodiments. The data packets having the masked header are transmitted to the server 150, which in turn transmits the data packets to the intended recipients designated by the operator of the mobile terminal. Similar to the exemplary embodiments described above, the server can perform the header masking processing described with reference to FIGS. 4, 6 and 8A-8D for data packets received from the mobile terminal to circumvent port restrictions imposed by various carrier networks.

The program also causes the processor of the mobile terminal to receive one or more data packets representing commands and half-duplex radio communications. In particular, the program causes the processor of the mobile terminal to receive data packets from the server 150 via the communication network 120 (step S112). The received data packets are digital data that have been converted from analog half-duplex radio communications and/or commands, and the header of such packets have a masked destination port to appear as a data transfer port of the mobile terminal configured to exchange data with the server.

Upon receiving data packets from the server 150 via the communication network 120, the program causes the processor of the mobile terminal to convert the received data packets into an analog half-duplex radio communication (step S114). The program then causes the processor of the mobile terminal to output the half-duplex radio communication (step S116). In particular, the program causes the processor of the mobile terminal to detect the audio component included in the analog half-duplex radio communication, and to apply an appropriate voltage to an audio output unit of the mobile terminal to activate the audio output unit and thereby cause the audio output unit to output the half-duplex radio communication via a speaker or the like. In the case where the radio data packets received from the server 150 contain image data such as a facsimile communication transmitted as a radio communication, the exemplary program can cause the processor of the mobile terminal to active a display unit of the mobile terminal to display the facsimile communication by causing an appropriate voltage to be applied thereto. When activating the audio output unit or display unit of the mobile terminal by causing the processor of the mobile terminal to apply an appropriate voltage thereto, the program can also cause the processor to suppress operation of the various keys assigned to function as the PTT button and command buttons of the mobile terminal, until the half-duplex radio communication is completely reproduced by the audio output unit or display unit, as appropriate.

A dotted line is included in FIG. 11 to separate the operations performed with respect to a mobile terminal transmitting a half-duplex radio communication in the form of one or more data packets, and the operations performed with respect to the mobile terminal receiving a half-duplex radio communication in the form of one of one or more data packets. The exemplary program was described above as causing the processor of the mobile terminal to perform the transmission and reception operations. However, it is to be understood that while these two operations may be performed in succession as shown in FIG. 11, the transmission and reception operations are performed independently from one another. Therefore, it is to be understood that the program may cause the processor of the mobile terminal to perform only one of the transmission and reception operations at any given time, or perform the transmission and reception operations in a reverse order to that which is shown in FIG. 11.

Accordingly, the exemplary program of the present disclosure causes a mobile terminal to communicate as a two-way radio with a transceiver and/or another mobile terminal over a communication network via a server. The exemplary program thus enables commercially available mobile terminals such as PDAs, EDAs, smart phones and cellular telephones, for example, to function as a two-way radio via RoIP. The features of masking data packets sent from the mobile terminal to the server and masking data packets sent from the server to the mobile terminal enables the mobile terminal having the program installed thereon to circumvent port restrictions imposed by carrier networks such as cellular and satellite carriers.

Thus, any commercially available mobile terminal having the program installed thereon is enabled to communicate with a plurality of other mobile terminals and RF transceivers via two-way radio over the communication network. The two-way radio communication capabilities of the mobile terminal enable peer-to-peer and unlimited multicast communications. The program therefore provides a number of advantageous aspects. For instance, the range of communication between mobile terminals and the RF transceivers is not geographically limited. Thus, the mobile terminal can communicate with other mobile terminals and RF transceivers located anywhere in the world, and vice versa, through the communication network. In addition, the communication channels or frequency bands used by the mobile terminals and RF transceivers need not be compatible with each other. Because the radio communications originating from the mobile terminals and RF transceivers are converted into digital data packets transmitted over the communication network and then decoded back into a radio communication, the mobile terminals and RF transceivers are not limited to any frequencies. Another advantage is that mobile terminals can communicate via two-way radio with existing legacy radio systems. Thus, enterprises can continue to use their legacy equipment to achieve the expanded communication ability of communicating with mobile terminals without regard to geographic or channel constraints.

In addition, mobile terminals connected to wireless voice and data service carriers such as cellular or satellite carriers are enabled to perform two-way radio communications with any other mobile terminal having the program stored thereon as well as existing radio system connected to the communication network without being constrained by port restrictions of the carriers. The mobile terminals transmit and receive data packets representing half-duplex radio communications on the data network of the cellular or satellite carrier. This is different from conventional cellular walkie-talkie services, in which half-duplex radio communications are transmitted and received on the voice network of the cellular carrier. Accordingly, the traffic of half-duplex radio communications between the mobile terminals and RF transceivers appears as any form of data to the carriers, such as a web page or email, for example. Furthermore, in contrast to conventional walkie-talkie services, mobile terminals having the program installed thereon can communicate via two-way radio with other mobile terminals that are not serviced by the same carrier. For consumers, this can result in lower monthly fees for using the carrier's services, because wireless carriers typically charge graduated fees based on the total number of minutes used for voice services, but charge flat rate fees for data services. In addition, in the event of an emergency, when cellular or satellite voice services may be flooded or preempted, data services of the carriers may still be available, and thus, the mobile terminals can continue to communicate with the RF transceivers without regard to the current state of the voice services of the carrier network.

The present disclosure also provides a method of enabling a mobile terminal to communicate as a two-way radio with one or more other mobile transceivers and/or RF transceivers over a communication network via a server. The method according to the present disclosure includes operations corresponding to the functional characteristics of the above-described components of the exemplary systems 100, 500 and 700.

Combinations of the above-described exemplary embodiments, and other embodiments not specifically described herein will be apparent to those skilled in the art upon reviewing the above description. The scope of the various exemplary embodiments includes various other applications in which the above systems, structures, programs and methods are used.

It will be appreciated by those skilled in the art that the exemplary embodiments of the present disclosure can be embodied in other specific forms without departing from the spirit or essential character thereof. The presently disclosed embodiments are considered in all respects to be illustrative and not restrictive. The scope of the invention is indicated by the appended claims rather than the foregoing description, and all changes that come within the meaning and range of equivalents thereof are indicated to be embraced therein.

What is claimed is:

1. A system for enabling a mobile terminal to communicate with a radio frequency transceiver via two-way radio, the system comprising:
a mobile terminal configured to receive audio inputs and output audio;
a radio frequency transceiver configured to broadcast radio communications to a plurality of radio terminals, and receive radio communications from at least one of the plurality of radio terminals; and
a server configured to transmit first data packets from the mobile terminal to the radio frequency transceiver via a communication network, receive second data packets, which are converted from a radio communication transmitted from the radio frequency transceiver, via the communication network, and transmit the second data packets to the mobile terminal via the communication network,
wherein the mobile terminal comprises:
a command input unit configured to receive a command input including a transmit command to transmit a first radio communication to the radio frequency transceiver via the communication network, and a network address of the sever on the communication network;
an audio input unit configured to receive the first radio communication as an audio input when the command input unit receives the command input;
a conversion unit configured to convert the first radio communication received by the audio input unit into the first data packets, and mask a destination port of the first data packets to appear as a data transfer port of the mobile terminal configured to exchange data with the server;
a transmission unit configured to transmit the converted first data packets having the masked destination port to the server via the communication network;
a reception unit configured to receive the second data packets from the server via the communication network, and output the received second data packets to the conversion unit, which is configured to convert the second data packets into a second radio communication; and
an audio output unit configured to output the second radio communication converted by the conversion unit,
wherein the server is configured to transmit the converted first data packets received from the transmission unit of the mobile terminal to the radio frequency transceiver via the communication network, and the radio frequency transceiver is configured to broadcast the first radio communication, which is converted from the received first data packets, to the plurality of radio terminals,
wherein the radio transceiver is configured to receive the second radio communication from at least one of the plurality of radio terminals, and transmit the received second radio communication to the server, which is configured to receive, via the communication network, second data packets converted from the second radio communication transmitted from the radio transceiver, and
wherein the server is configured to transmit the second data packets, whose destination port has been masked to appear as a data receiving port of the mobile terminal configured to exchange data with the server, to the reception unit of the mobile terminal.

2. The system of claim 1, wherein the communication network is one of the Internet and a private network.

3. The system of claim 1, wherein the first radio communication received by the audio input unit is a half-duplex radio communication, and the second radio communication output by the audio output unit is a half-duplex radio communication.

4. The system of claim 1, wherein the conversion unit is configured to make the destination port of the first data packets appear to be any data transfer port that is not associated with transferring audio data converted from voice data.

5. The system of claim 4, wherein the conversion unit is configured to make the destination port of the first data packets appear to be one of a port associated with transferring a website and a port associated with transmitting email.

6. The system of claim 1, wherein the conversion unit is configured to mask the destination port of the first data packets by appending a header containing a data transfer port of the mobile terminal configured to exchange data with the server to an original header of the first data packets.

7. The system of claim 6, wherein the conversion unit is further configured to mask a source port of the first data packets in the header appended to the original header to a data source port of the mobile terminal configured to exchange data with the server.

8. The system of claim 1, wherein the transmission unit is configured to transmit the converted first data packets having the masked destination port to the server via the TCP/IP protocol, and the reception unit is configured to receive the second data packets from the server via the TCP/IP protocol.

9. The system of claim 1, wherein the first and second data packets each contain a digitized half-duplex radio communication including an audio component.

10. The system of claim 1, further comprising:
a computer connected to the server via the communication network; and
an interface connecting the computer to the radio transceiver to exchange radio communication signals between the radio frequency transceiver and the computer,
wherein the server is configured to transmit the first data packets to the computer together with a PTT (push-to-talk) instruction identifying the first data packets as a half-duplex radio communication.

11. The system of claim 10, wherein:
the computer is configured to receive the first data packets and the PTT instruction from the server via the communication network, convert the first data packets to the first radio communication, and transmit the converted first radio communication and the PTT instruction to the interface;
the interface is configured to connect an audio output terminal of the computer to an audio input terminal of the radio frequency transceiver, and, in accordance with the PTT instruction, activate a transmit terminal of the radio frequency transceiver to transmit the converted first radio communication to the radio terminals;
the interface is configured to connect a receive terminal of the radio frequency transceiver to an audio input terminal of the computer, and is configured to be connected to a control terminal of the computer;
the interface is configured to transmit a communication reception instruction to the control terminal of the computer when the radio frequency transceiver receives the second radio communication from the at least one radio terminal, and transmit the second radio communication received from the radio frequency transceiver to the audio input terminal of the computer; and the computer, upon receiving the communication reception instruction, is configured to convert the second radio communication received from the radio frequency transceiver to the second data packets, and transmit the converted second data packets to the server via the communication network.

12. The system of claim 11, wherein the computer is configured to mask the destination port of the second data packets to appear as a data receiving port of the mobile terminal configured to exchange data with the server.

13. The system of claim 1, wherein the server, upon receiving the second data packets, is configured to mask the destination port of the second data packets to appear as a data receiving port of the mobile terminal configured to exchange data with the server.

14. The system of claim 1, wherein the mobile terminal further comprises a control unit configured to activate the audio input unit when the command input is input to the command input unit, activate the conversion unit when the audio input receives the first radio communication, activate the conversion unit when the reception unit receives the second data packets, and activate the audio output unit when the conversion unit converts the second data packets into the second radio communication.

15. The system of claim 1, wherein the transmission unit and the reception unit of the mobile terminal connect to the communication network via at least one of a cellular network and a satellite network.

16. The system of claim 1, further comprising:
a plurality of radio frequency transceivers each being configured to broadcast radio communications to a corresponding plurality of radio terminals, respectively;
a plurality of computers respectively provided for the plurality of radio frequency transceivers in one-to-one correspondence, each of the plurality of computers being respectively connected to the server via the communication network; and
a plurality of interfaces respectively connecting the plurality of computers to the plurality of radio frequency transceivers to exchange radio communications between the plurality of computers and the plurality of radio frequency transceivers, respectively.

17. The system of claim 16, wherein:
the plurality of computers are configured to receive the first data packets from the server via the communication network, convert the first data packets to the first radio communication, and transmit the converted first radio communication to the corresponding interface;
the plurality of interfaces are configured to connect an audio output terminal of the corresponding computer to an audio input terminal of the corresponding radio frequency transceiver, and activate a transmit terminal of the corresponding radio frequency transceiver to transmit the converted first radio communication to the corresponding plurality of radio terminals;
the plurality of interfaces are configured to connect a receive terminal of the corresponding radio frequency transceiver to an audio input terminal of the corresponding computer, and the corresponding radio frequency transceiver is configured to transmit a radio communication received from at least one of the corresponding plurality of radio terminals to the audio input terminal of the corresponding computer via the corresponding interface; and the computer receiving the radio communication via the corresponding interface is configured to convert the received radio communication to the second data packets, and transmit the converted second data packets to the server via the communication network.

18. The system of claim 16, wherein the command input received by the command input unit includes a designation of a group of a plurality of independent radio frequency transceivers each being configured to transmit radio communications to and receive radio communications from a corresponding plurality of radio terminals, respectively.

19. The system of claim 16, wherein the server is configured to multicast the first radio communication to the plurality of radio frequency transceivers.

20. A system for enabling a plurality of mobile terminals to communicate with each other via two-way radio, the system comprising:
a first mobile terminal configured to receive a first radio communication as an audio input, transmit first data packets as the received first radio communication, and output a second radio communication as an audio output;
a second mobile terminal configured to receive the second radio communication as an audio input, transmit second data packets as the received second radio communication, and output the first radio communication as an audio output; and
a server configured to receive the first data packets from the first mobile terminal via a communication network, transmit the received first data packets to the second mobile terminal via the communication network, receive the second data packets from the second mobile terminal via the communication network, and transmit the received second data packets to the first mobile terminal via the communication network,
wherein the first mobile terminal comprises:
a first command input unit configured to receive a first command input including a first transmit command to transmit the first radio communication to the second mobile terminal via the communication network, and a network address of the server on the communication network;
a first audio input unit configured to receive the first radio communication when the first command input unit receives the first command input;
a first conversion unit configured to convert the first radio communication received by the first audio input unit into the first data packets, and mask a destination port of the first data packets to appear as a data transfer port of the first mobile terminal configured to exchange data with the server;
a first transmission unit configured to transmit the converted first data packets having the masked destination port to the server via the communication network;
a first reception unit configured to receive the second data packets from the server via the communication network, and output the received second data packets to the first conversion unit, which is configured to convert the second data packets into the second radio communication; and
a first audio output unit configured to output the second radio communication converted by the first conversion unit, and
wherein the second mobile terminal comprises:
a second command input unit configured to receive a second command input including a second transmit command to transmit the second radio communication to the first mobile terminal via the communication network, and the network address of the server on the communication network;

a second audio input configured to receive the second radio communication when the second command input unit receives the second command input;

a second conversion unit configured to convert the second radio communication received by the second audio input unit into the second data packets, and mask a destination port of the second data packets to appear as a data transfer port of the second mobile terminal configured to exchange data with the server;

a second transmission unit configured to transmit the converted second data packets having the masked destination port to the server via the communication network;

a second reception unit configured to receive the first data packets from the server via the communication network, and output the received first data packets to the second conversion unit, which is configured to convert the first data packets into the first radio communication; and a second audio output unit configured to output the first radio communication converted by the second conversion unit.

21. The system of claim 20, wherein the communication network is one of the Internet and a private network.

22. The system of claim 20, wherein the first radio communication received by the first audio input unit is a half-duplex radio communication, and the second radio communication received by the second audio input unit is a half-duplex radio communication.

23. The system of claim 20, wherein the first and second conversion units are respectively configured to make the destination port of the first and second data packets appear to be any data transfer port that is not associated with transferring audio data converted from voice data.

24. The system of claim 23, wherein the first and second conversion units are respectively configured to make the destination port of the first and second data packets appear to be one of a port associated with transferring a website and a port associated with transmitting email.

25. The system of claim 20, wherein:

the first conversion unit is configured to mask the destination port of the first data packets by appending a header containing a data transfer port of the first mobile terminal configured to exchange data with the server to an original header of the first data packets; and the second conversion unit is configured to mask the destination port of the second data packets by appending a header containing a data transfer port of the second mobile terminal configured to exchange data with the server to an original header of the second data packets.

26. The system of claim 25, wherein:

the first conversion unit is further configured to mask the source port of the first data packets in the header appended to the original header of the first data packets to a data source port of the first mobile terminal configured to exchange data with the server; and the second conversion unit is further configured to mask the source port of the second data packets in the header appended to the original header of the second data packets to a data source port of the second mobile terminal configured to exchange data with the server.

27. The system of claim 25, wherein:

the server is configured to remove the masking header appended to the first data packets received from the first mobile terminal, determine that the first data packets are to be received by the second mobile terminal based on identification information of the second mobile terminal included in the original header of the first data packets, mask the destination port of the first data packets by appending another header containing a data receiving port of the second mobile terminal configured to exchange data with the server to the original header of the first data packets, and transmit the first data packets having the other masking header appended thereto to the second mobile terminal; and the server is configured to remove the masking header appended to the second data packets received from the second mobile terminal, determine that the second data packets are to be received by the first mobile terminal based on identification information of the first mobile terminal included in the original header of the second data packets, mask the destination port of the second data packets by appending another header containing a data receiving port of the first mobile terminal configured to exchange data with the server to the original header of the second data packets, and transmit the second data packets having the other masking header appended thereto to the first mobile terminal.

28. The system of claim 20, wherein:

the first transmission unit is configured to transmit the converted first data packets having the masked destination port to the server via the TCP/IP protocol, and the first reception unit is configured to receive the second data packets from the server via the TCP/IP protocol; and the second transmission unit is configured to transmit the converted second data packets having the masked destination port to the server via the TCP/IP protocol, and the second reception unit is configured to receive the first data packets from the server via the TCP/IP protocol.

29. The system of claim 20, wherein the first and second data packets each contain a digitized half-duplex radio communication including an audio component, which includes one of a recorded voice and a digital image representing a facsimile communication.

30. The system of claim 20, wherein:

the first mobile terminal further comprises a first control unit configured to activate the first audio input unit when the first command input is input to the first command input unit, activate the first conversion unit when the first audio input unit receives the first radio communication, activate the first conversion unit when the first reception unit receives the second data packets, and activate the first audio output unit when the first conversion unit converts the second data packets into the second radio communication; and the second mobile terminal further comprises a second control unit configured to activate the second audio input unit when the second command input is input to the second command input unit, activate the second conversion unit when the second audio input unit receives the second radio communication, activate the second conversion unit when the first reception unit receives the first data packets, and activate the second audio output unit when the second conversion unit converts the first data packets into the first radio communication.

31. The system of claim 20, further comprising a plurality of the second mobile terminals, wherein:

the first command input unit is configured to receive the first command input unit including a designation of a predetermined number of the plurality of second mobile terminals to which the first radio communication is to be transmitted;

the first conversion unit is configured to, when converting the first radio communication into the first data packets, identify a unique address of each one of the predetermined number of the plurality of second mobile terminals in an original header of the first data packets, and mask the destination port of the first data packets by appending a header containing a destination port of the first mobile terminal configured to exchange data with the server to the original header of the first data packets;

the first transmission unit is configured to transmit the converted first data packets having the masked destination port and the original header identifying the unique address of each one of the predetermined number of the plurality of second mobile terminals; and the server is configured to multicast the first data packets to each one of the predetermined number of plurality of second mobile terminals.

32. The system of claim 20, wherein the first and second transmission units and the first and second reception units of the first and second mobile terminals, respectively, connect to the communication network via at least one of a cellular network and a satellite network.

33. A mobile terminal configured to communicate with a transceiver via two-way radio over a communication network via a server interfacing the mobile terminal and the transceiver over the communication network, the mobile terminal comprising:

a command input unit configured to receive a command input including a transmit command to transmit a first radio communication to the transceiver via the communication network, and a network address of the server on the communication network;

an audio input unit configured to receive the first radio communication as an audio input when the command input unit receives the command input;

a conversion unit configured to convert the first radio communication received by the audio input unit into first data packets, and mask a destination port of the first data packets to appear as a data transfer port of the mobile terminal configured to exchange data with the server;

a transmission unit configured to transmit the converted first data packets having the masked destination port to the server via the communication network for the server to transmit the first radio communication, which is converted from the first data packets, to the transceiver;

a reception unit configured to receive second data packets, which are converted from a second radio communication transmitted from the transceiver and which have a destination port masked to appear as the data transfer port of the mobile terminal configured to exchange data with the server, from the server via the communication network, and output the received second data packets to the conversion unit, which is configured to convert the second data packets into the second radio communication; and an audio output unit configured to output the second radio communication as an audio output.

34. The mobile terminal of claim 33, wherein the communication network is one of the Internet and a private network.

35. The mobile terminal of claim 33, wherein the first radio communication received by the audio input unit is a half-duplex radio communication, and the second radio communication outputted by the audio output unit is a half-duplex radio communication.

36. The mobile terminal of claim 33, wherein the conversion unit is configured to make the destination port of the first data packets appear to be any data transfer port that is not associated with transferring audio data converted from voice data.

37. The mobile terminal of claim 36, wherein the conversion unit is configured to make the destination port of the first data packets appear to be one of a port associated with transferring a website and a port associated with transmitting email.

38. The mobile terminal of claim 33, wherein the conversion unit is configured to mask the destination port of the first data packets by appending a header containing a data transfer port of the mobile terminal configured to exchange data with the server to an original header of the first data packets.

39. The mobile terminal of claim 38, wherein the conversion unit is further configured to mask the source port of the first data packets in the header appended to the original header of the first data packets to a data source port of the mobile terminal configured to exchange data with the server.

40. The mobile terminal of claim 33, wherein the transmission unit is configured to transmit the converted first data packets having the masked destination port to the server via the TCP/IP protocol, and the reception unit is configured to receive the second data packets from the server via the TCP/IP protocol.

41. The mobile terminal of claim 33, wherein the first and second data packets each contain a digitized half-duplex radio communication including an audio component, which includes one of a recorded voice and a digital image representing a facsimile communication.

42. The mobile terminal of claim 33, further comprising a control unit configured to activate the audio input unit when the command input is input to the command input unit, activate the conversion unit when the audio input unit receives the first radio communication, activate the conversion unit when the reception unit receives the second data packets, and activate the audio output unit when the first conversion unit converts the second data packets into the second radio communication.

43. The mobile terminal of claim 33, wherein the transceiver is at least one of another mobile terminal and a radio frequency transceiver, which is configured to receive the first radio communication converted from the first data packets via the server, and perform two-way radio communications with other radio frequency transceivers.

44. The mobile terminal of claim 33, wherein the transmission unit and the reception unit connect to the communication network via at least one of a cellular network and a satellite network.

45. A non-transitory computer-readable recording medium having a program stored thereon that causes a mobile terminal communicatively connected to the computer-readable recording medium to communicate as a two-way radio with a transceiver over a communication network via a server, the program causing the mobile terminal to perform operations comprising:

receiving a command input including a transmit command to transmit a first radio communication to a transceiver via the communication network, and a network address of the server;

receiving the first radio communication as an audio input;

converting the received first radio communication to first data packets upon receiving the command input;

masking a destination port of the first data packets to appear as a data transfer port of the mobile terminal configured to exchange data with the server;

transmitting the converted first data packets having the masked destination port to the server via the communication network for the server to transmit the first data packets, which are converted back into the first radio communication, to the transceiver;

receiving second data packets from the server via the communication network, the second data packets having been converted from a second radio communication transmitted from the transceiver and having a destination port masked to appear as a data receiving port of the mobile terminal configured to exchange data with the server;

converting the received second data packets into the second radio communication; and outputting the second radio communication.

46. The computer-readable recording medium of claim 45, wherein the computer-readable recording medium is configured to be inserted into a memory slot of the mobile terminal.

47. The computer-readable recording medium of claim 45, wherein the computer-readable medium is a memory of the mobile terminal.

48. The computer-readable recording medium of claim 45, wherein the program is an application program operable with an operating system of the mobile terminal.

49. The computer-readable recording medium of claim 45, wherein the communication network is one of the Internet and a private network.

50. The computer-readable recording medium of claim 45, wherein the first radio communication received in the operation of receiving the first radio communication is a half-duplex radio communication, and the second radio communication outputted in the operation of outputting the second radio communication is a half-duplex radio communication.

51. The computer-readable recording medium of claim 45, wherein the operation of masking the destination port of the first data packets comprises making the destination port of the first data packets appear to be any data transfer port that is not associated with transferring audio data converted from voice data.

52. The computer-readable recording medium of claim 51, wherein the operation of masking the destination port of the first data packets comprises making the destination port of the first data packets appear to be one of a port associated with transferring a website and a port associated with transmitting email.

53. The computer-readable recording medium of claim 45, wherein the operation of masking the destination port of the first data packets comprises appending a header containing a data transfer port of the mobile terminal configured to exchange data with the server to an original header of the first data packets.

54. The computer-readable recording medium of claim 53, wherein the program further causes the mobile terminal to perform an operation of masking the source port of the first data packets in the header appended to the original header of the first data packets to a data source port of the mobile terminal configured to exchange data with the server.

55. The computer-readable recording medium of claim 45, wherein the operation of transmitting the converted first data packets comprises transmitting the converted first data packets having the masked destination port to the server via the TCP/IP protocol, and operation of receiving the second data packets from the server comprises receiving the second data packets from the server via the TCP/IP protocol.

56. The computer-readable recording medium of claim 45, wherein the first and second data packets each contain a digitized half-duplex radio communication including an audio component,
which includes one of a recorded voice and a digital image representing a facsimile communication.

57. The computer-readable recording medium of claim 45, wherein the program further causes the mobile terminal to perform operations comprising:
activating an audio input unit of the mobile terminal when the command input is received, by applying an appropriate voltage to the audio input unit;
activating a conversion unit of the mobile terminal when the first radio communication is received, by applying an appropriate voltage to the conversion unit;
activating the conversion unit when the second data packets are received, by applying an appropriate voltage to the conversion unit; and
activating an audio output unit of the mobile terminal when the second data packets are converted into the second radio communication.

58. The computer-readable recording medium of claim 45, wherein the transceiver is at least one of another mobile terminal and a radio frequency transceiver, which is configured to receive the first radio communication converted from the first data packets via the server, and perform two-way radio communications with other radio frequency transceivers.

59. The computer-readable recording medium of claim 45, wherein the program causes the mobile terminal to connect to the communication network via at least one of a cellular network and a satellite network to perform the operation of transmitting the converted first data packets to the server and the operation of receiving the second data packets from the server.

60. A method of enabling a mobile terminal to communicate as a two-way radio with transceivers over a communication network via a server, the method comprising:
receiving a command input including a transmit command to transmit a first radio communication to a transceiver via the communication network, and a network address of the server;
receiving the first radio communication as an audio input;
converting the received first radio communication to first data packets upon receiving the command input;
masking a destination port of the first data packets to appear as a data transfer port of the mobile terminal configured to exchange data with the server;
transmitting the converted first data packets having the masked destination port to the server via the communication network for the server to transmit the first data packets, which are converted back into the first radio communication, to the transceiver;
receiving second data packets from the server via the communication network, the second data packets having been converted from a second radio communication transmitted from the transceiver and having a destination port masked to appear as a data receiving port of the mobile terminal configured to exchange data with the server;
converting the received second data packets into the second radio communication; and
outputting the second radio communication.

* * * * *